United States Patent [19]
Sugitani et al.

[11] Patent Number: 5,912,539
[45] Date of Patent: Jun. 15, 1999

[54] ELECTRIC POWER STEERING APPARATUS

[75] Inventors: Nobuo Sugitani; Takao Kurosawa; Shinzi Hironaka, all of Wako, Japan

[73] Assignee: Honda Giken Kogyo Kabushiki Kaisha, Tokyo, Japan

[21] Appl. No.: 09/000,697

[22] Filed: Dec. 30, 1997

[30] Foreign Application Priority Data

Jan. 7, 1997 [JP] Japan .................................. 9-000990

[51] Int. Cl.$^6$ ...................................................... B62D 5/04
[52] U.S. Cl. ............................ 318/434; 701/43; 180/443
[58] Field of Search ................................... 318/432, 434, 318/293; 361/23, 25, 31; 364/424.051, 424.052, 424.053; 180/404, 412, 443, 446; 312/280–286; 701/41–43; 388/829, 831, 915

[56] References Cited

U.S. PATENT DOCUMENTS

| | | | |
|---|---|---|---|
| 5,485,067 | 1/1996 | Nishimoto et al. | 318/466 |
| 5,552,684 | 9/1996 | Wada et al. | 318/293 |
| 5,563,790 | 10/1996 | Wada et al. | 364/424.051 |
| 5,602,735 | 2/1997 | Wada | 364/424.051 |
| 5,720,361 | 2/1998 | Nishimoto et al. | 180/446 |
| 5,752,209 | 5/1998 | Nishimoto et al. | 701/41 |
| 5,845,738 | 12/1998 | Nishino et al. | 180/443 |

FOREIGN PATENT DOCUMENTS 8-91239  4/1996  Japan .

*Primary Examiner*—Jonathan Wysocki
*Attorney, Agent, or Firm*—Merchant, Gould, Smith, Edell, Welter & Schmidt, P.A.

[57] ABSTRACT

An electric power steering apparatus includes a judgment unit which passes a judgment that a condition, in which an offset signal indicative of the offset between a target current signal and a motor current signal, or a drive control signal used for controlling an electric motor is greater than a threshold, has continued for an allowable time. Based on this judgment, a forced drive control unit forcibly drives the electric motor. A fault judgment unit monitors the motor current in all times and judges a current detecting unit to be at fault if the motor current does not vary even though the electric motor is drive forcibly. Thus, even when a failure in the current detecting unit occurs during movement of a motor vehicle, such failure can reliably be detected. Additionally, since the judgment is performed after the electric motor is driven forcibly, misjudgment does not occur even when the judgement at the judgment unit results from continuous application of abrupt manual steering operation.

16 Claims, 19 Drawing Sheets

(PRIOR PROBLEM)

(PRIOR PROBLEM)

ELECTRIC POWER STEERING APPARATUS

BACKGROUND OF THE INVENTION

1. Field of the Invention

The present invention relates generally to an electric power steering apparatus which provides power assist of an electric motor directly to a steering system so as to reduce necessary steering power to be applied by the driver. More particularly, it relates to such an electric power steering apparatus which is capable of detecting an operation failure of a current detecting unit provided to detect a current flowing through the electric motor.

2. Description of the Related Art

In general, the electric power steering apparatus includes an electric motor incorporated in a steering system and a control unit or controller which controls operation of the electric motor to eventually reduce a manual steering effort or force required by the driver.

FIG. 17 of the accompanying drawings shows in block diagram the general construction of a conventional controller 200A. The controller 200A includes a target current determining unit 210, a PWM (pulse width modulation) signal generating section or generator 220, and a motor drive unit 230. The target current determining unit 210 determines a target assist torque on the basis of a steering torque signal Tp and generates a target current signal IT required for an electric motor 100 to exert the target assist torque to a steering system. The PWM signal 220 generates, on the basis of the target current signal IT, a PWM signal as a drive control signal 220a which is used for controlling operation of the electric motor 100.

The motor drive unit 230 has a gate drive circuit 240 and an electric motor drive circuit 250 including four power FETs (field-effect transistors) connected together to form a bridge H-network. The gate drive circuit 240 drives, on the basis of the drive control signal (PWM signal) 220a, the gate of each of the FETs to turn on or conduct the individual FETs. Thus, on the basis of the steering torque signal Tp corresponding to a steering torque detected by a steering torque detecting unit 120, electric power supplied from a battery power source BAT to the electric motor 100 is altered into a pulse-like shape in an effort to control output power (steering assist torque) of the electric motor 100.

FIG. 18 shows in block diagram the construction of another conventional controller 200B. In the controller 200B, a motor current IM actually supplied to an electric motor 100 is detected so that a feedback control of the electric motor 100 is performed on the basis of the motor current IM, so as to improve the control characteristics of the electric motor 100. The controller 200B of this motor current feedback control type differs from the controller 200A shown in FIG. 17 in that it further includes a current detecting unit 260 for detecting a current flowing through the electric motor 100 so as to generate a motor current signal IM, an offset calculating unit 270 for determining an offset between the motor current signal IM and a target current signal IT, and a motor operation control unit 280 for generating, on the basis of the offset signal 270a generated from the offset calculating unit 270, a drive control signal 220a to drive the electric motor 100.

The motor operation control unit 280 includes a current feedback (F/B) control section 290 and a PWM signal generator 220. The current F/B control section 290 performs control actions, such as proportional, integral, derivative and so forth. for the offset signal to generate a drive current signal 290a for controlling a current to be supplied to the electric motor 100 in such a manner as to tend the offset toward zero. The PWM signal generator 220 generates, on the basis of the drive current signal 290a, a PWM signal for the drive control of the electric motor 100 and outputs the generated PWM signal as the above-mentioned drive control signal 220a.

The controller 200B of the motor current feedback control type shown in FIG. 18 is able to improve the control accuracy and response because operation of the electric motor 100 is controlled in such a manner that the offset between the target motor current IT and the actual motor current IM tends to zero.

However, when the current detecting unit 260 causes an operation failure which, for example, tends to fix the detected current at a particular value (including zero), the controller 200B of this type cannot perform the normal feedback control operation any more, failing to supply a desired steering assist torque to the steering system.

FIGS. 19A and 19B are graphs illustrative of an example of the operation failure in which the output (detected current) IM from the current detecting unit 260 is fixed at a constant value. FIG. 19A exemplifies the time-current characteristic of the target current IT and the detected current IM, and FIG. 19B shows the time-current characteristic of the drive control signal 220a generated from the motor operation control unit 280 on the basis of the offset 270a between the target current IT and the detected current IM shown in FIG. 19a. In the case where the output from the current detecting unit 260 is fixed at a current value IMα, the motor operation control unit 280 generates, on the basis of an offset between a target current IT and the detected current IMα, a drive control signal 220a tending to vary a current to be supplied to the electric motor 100 in such a manner as to tend the offset closer toward zero. In this instance, however, since the detected current value is fixed and does not vary any more, the drive control signal 220a generated from the motor operation control unit 280 has a larger level in the direction to cancel out the offset.

Japanese Patent Laid-open Publication No. HEI 8-91239 discloses a controller for an electric power steering apparatus, which can detect a failure in a motor current detecting unit. The disclosed controller is constructed to check the motor current detecting unit for a possible failure immediately after an ignition key is turned on. To this end, the controller applies a voltage V across an electric motor for a time T which is much less than a mechanical time constant Tm of the motor and which is much greater than an electric time constant Te of the motor (Te<<T<<Tm). While applying the voltage to the electric motor, the controller determines whether or not the motor current detecting unit is at fault, through a comparison made between an estimated motor current is which is estimated from a motor terminal voltage V and a motor terminal resistance R, and a motor current i appearing in a condition in which an angular velocity ω of the motor is approximately zero, i.e., the motor is substantially not rotating.

The controller disclosed in Japanese Patent Laid-open Publication No. HEI 8-91239 is so constructed as to check the motor current detecting unit (motor current detecting unit) against a failure immediately after the ignition key is turned on, and so this controller cannot detect any operation failure in the motor current detecting unit occurring during movement of the motor vehicle. In order to determine the estimated motor current is based on the motor terminal voltage V and the motor terminal resistance R, detection of a battery voltage is inevitable. As a consequence, the controller further requires a battery voltage detector and so on. Additionally, the motor terminal resistance R needs to be registered in advance. Accordingly, when the motor is replaced with a different type of motor, re-registration of the motor terminal resistance R is needed.

SUMMARY OF THE INVENTION

With the foregoing drawbacks in view, it is an object of the present invention to provide an electric power steering apparatus which is capable of detecting an operation failure of a motor current detecting unit during movement of a motor vehicle without the need for registration of a battery terminal voltage and a motor terminal resistance in advance.

According to a first aspect of the present invention, there is provided an electric power steering apparatus in which an assist torque proportional to a manual steering torque is supplied from an electric motor to a steering system by controlling operation of the electric motor on the basis of a drive control signal generated based on an offset between a target current set in accordance with the steering torque and a motor current detected by a current detecting unit, wherein the electric power steering apparatus includes: a judgment unit which generates a judgment signal when a condition in which one of an offset signal representing the offset and the drive control signal exceeds a preset threshold has continued for a preset allowable time; a forced drive control unit which generates, on the basis of the judgment signal, a forced drive control signal tending to forcibly drive the electric motor; and a fault judgment unit which judges the current detecting unit to be at fault if the motor current signal does not vary even though the electric motor is forcibly driven.

With this arrangement of the electric power steering apparatus, when the judgment unit detects the fact that a condition, in which the offset signal or the drive control signal is greater than the threshold and, hence, large power is supplied to the electric motor, has continued for the allowable time, the forced drive control unit drive the electric motor forcibly. The fault judgment unit monitors the motor current and, if forced driving of the electric motor does not vary the motor current, it judges that the current detecting unit to be at fault. Accordingly, even when a failure in the current detecting unit occurs during movement of a motor vehicle in which the power steering apparatus of this invention is incorporated, such failure in the current detecting unit can reliably be detected. Additionally, even if the above-mentioned judgment of the judgment unit has passed as a result of continuous application of a large manual steering torque, misjudgment does not occur because the fault judgment against the current detecting unit is performed after the electric motor is driven forcibly.

The allowable time may be set to a response time during which a current supplied to the electric motor on the basis of the offset signal is fed back to tend the offset below the threshold.

The motor operation control unit preferably includes a drive current switching section for switching the offset signal and the forced drive control signal generated from the forced drive control unit.

The motor operation control unit may include a control mode switching section for switching, on the basis of a control mode switching command signal generated by the fault judgment unit when the fault judgment unit judges the current detecting unit to be at fault, the control mode of the motor operation control unit so as to perform operation control of the electric motor based on the target current signal.

The motor operation control unit may further include an adder for adding together the offset signal and the forced drive control signal generated from the forced drive control unit, so as to forcibly vary the current to be supplied to the electric motor.

Preferably, the judgment unit includes an absolute-value circuit for determining an absolute value of the offset signal to generate an absolute-value signal, a threshold circuit for generating a preset threshold signal, a comparator circuit for generating a comparison output signal if the offset signal is greater than the threshold, and a timer circuit for timing a duration of the comparison output signal to generate a judgment signal as an output signal from the judgment unit when the timed duration reaches the preset allowable time.

Preferably, the fault judgment unit, when it judges the current detecting unit to be at fault, generates a current feedback control stop command signal to stop generation of the drive control signal from the motor operation control unit.

Additionally, the fault judgment unit, when it judges the current detecting unit to be at fault, may generate an interrupting command signal, further including an interrupting device for interrupting supply of power from a battery to the electric motor on the basis of the interrupting command signal.

According to a second aspect of the present invention, there is provided an electric power steering apparatus in which an assist torque proportional to a manual steering torque is supplied from an electric motor to a steering system by controlling operation of the electric motor on the basis of a drive control signal generated based on an offset between a target current set in accordance with the steering torque and a motor current detected by a current detecting unit, wherein the electric power steering apparatus includes: a judgment unit which generates a judgment signal if a variation of the motor current signal per unit time is smaller than a predetermined value when one of the offset signal and the drive control signal is greater than a preset threshold; a forced drive control unit for generating, on the basis of the judgment signal, a forced drive control signal tending to forcibly drive the electric motor; and a fault judgment unit which judges the current detecting unit to be at fault if the motor current signal does not vary even though the electric motor is forcibly driven.

With this arrangement, when the judgment unit detects the fact that even though the motor current is to be varied widely due to the offset signal or the drive control signal which is greater than the threshold, a variation of the motor current signal per unit time is small (less than the predetermined value), the forced drive control unit drive the electric motor forcibly. The fault judgment unit monitors the motor current and, if forced driving of the electric motor does not vary the motor current, it judges that the current detecting unit to be at fault. Accordingly, even when a failure in the current detecting unit occurs during movement of the motor vehicle, such failure in the current detecting unit can reliably be detected. Additionally, even when the variation of the motor current signal per unit time is restricted to a small value due to a counter electromotive force generated during high speed rotation of the electric motor caused by abrupt manual steering operation, misjudgment does not occur because the fault judgment for the current detecting unit is performed after the electric motor is driven forcibly.

The judgment unit preferably acts to detect a condition in which a predetermined current is supplied to the electric motor, monitor a variation of the detected current which is the output from the current detecting unit, and generate a judgment signal if the variation is smaller than a preset value.

Preferably, the judgment unit includes a pulse width measuring section for calculating a duty cycle of the drive control signal to generate the result of calculation as a detected duty cycle, a threshold setting section for generating a preset threshold signal, an operating condition judgment section for making a judgment based on the detected duty cycle and the threshold signal to determine whether or not the electric motor is in the operating state and, if the judgment is indicative of the electric motor being in the operating state, for generating a motor operating condition detecting signal, a current variation detecting section for determining a variation of the motor current per a predetermined unit time while the motor operating condition detecting signal is being supplied from the operating condition judgment section, so as to generate an absolute value of the detected variation as a current variation, a fault judgment variation setting section for generating a preset fault judgment variation, and a current variation fault judgment section for comparing the current variation with the the fault judgment variation and, if the current variation is smaller than the fault judgment variation, for generating a judgment signal.

According to a third aspect of the present invention, there is provided an electric power steering apparatus in which an assist torque proportional to a manual steering torque is supplied from an electric motor to a steering system by controlling operation of the electric motor on the basis of a drive control signal generated based on an offset between a target current set in accordance with the steering torque and a motor current detected by a current detecting unit, wherein the electric power steering apparatus includes: a first judgment unit which generates a first judgment signal when a condition in which one of an offset signal representing the offset and the drive control signal exceeds a threshold has continued for a preset allowable time; a second judgment unit which generates a second judgment signal if a variation of the motor current signal per unit time is smaller than a predetermined value when the drive control signal is greater than a second threshold; a forced drive control unit which generates a forced drive control signal tending to forcibly drive the electric motor when the first and second judgment signals are supplied concurrently to the forced drive control unit; and a fault judgment unit which judges the current detecting unit to be at fault if the motor current signal does not vary even though the electric motor is forcibly driven.

With this arrangement, when the first and second judgment units concurrently generates the respective judgement signals, the forced drive control unit forcibly drive the electric motor. The fault judgment unit judges the current detecting unit to e at fault if the motor current doe not vary even though forcible driving of the electric motor is performed. Thus, a failure in the current detecting unit occurs during movement of the motor vehicle, such failure can reliably be detected. Judgment for a possible failure in the current detecting unit is performed after the electric motor is drive forcibly, migs-judgment does not occur even when abrupt manual steering operation continues.

The above and other objects, features and advantages of the present invention will become manifest to these versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Figure 1:
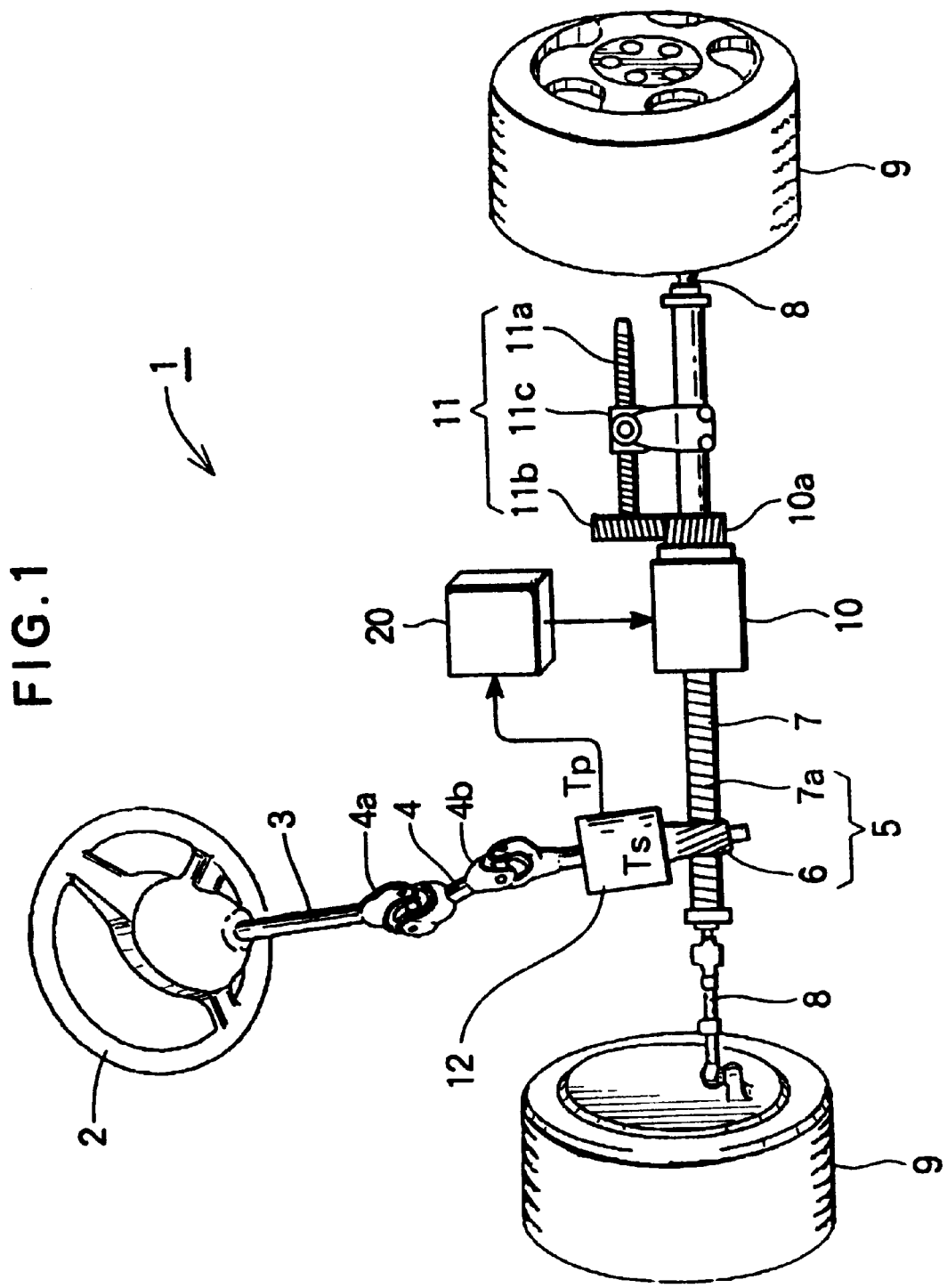
FIG. 1 is a diagrammatical view showing the general construction of an electric power steering apparatus to which the present invention pertains.

Certain preferred embodiments of the present invention will be described below in greater detail with reference to the accompanying drawings, wherein like reference characters designate like or corresponding parts throughout several views.

FIG. 1 shows an electric power steering apparatus 1 to which the present invention pertains. The electric power steering apparatus 1 includes a steering system equipped with an electric motor 10, and a control unit or controller 20 for controlling power of the electric motor 10 so as to reduce manual steering effort or power to be applied by the driver.

The steering system includes a steering wheel 2 attached to an end of a steering shaft 3. The opposite end of the steering shaft 3 is connected to one end of a connecting shaft 4 via a first universal joint 4a, the other end of the connecting shaft 4 being connected via a second universal joint 4b to a pinion 6 of a rack-and-pinion mechanism 5. The pinion 6 meshes with a rack 7 which is a long bar with teeth 7a cut into one side. The rack-and-pinion mechanism 5 translates a rotary motion of the pinion 6 into an axial reciprocating motion of the rack 7. Opposite ends of the rack 7 are connected via tie rods 8 to steerable left and right front wheels 9. When the steering wheel 2 is manually turned or rotated in a desired direction, the rack-and-pinion mechanism 5 and the tie rods 8 cause the front wheels 9 to pivot in the same direction to thereby change the direction of movement of a motor vehicle.

In order to reduce the manual steering effort or power required by the driver, the electric motor 10 is disposed in concentric relation to the rack 7 and supplies an assist torque (steering assist torque) to the rack 7. A ball screw mechanism 11 is disposed substantially parallel with the rack 7 so that rotational power of the electric motor 10 is converted by the ball screw mechanism 11 into an axial thrusting force acting on the rack 7. The electric motor 10 has a rotor equipped with a drive helical gear 10a which meshes with a drive helical gear 11b attached to an end of a screw shaft 11a of the ball screw mechanism 11. A nut 11c of the ball screw mechanism 11 is connected to the rack 7.

A steering torque detecting unit (steering torque sensor) 12 is disposed in a steering box (not shown) for detecting a manual steering torque Ts acting on the pinion 6. The steering torque detecting unit 12 supplies a steering torque signal Tp corresponding to the detected steering torque Ts, to the controller 20. The controller 20 performs controlled driving of the electric motor 10, with the steering torque signal Tp taken as a main signal in such an effort to control output power (steering assist torque) of the electric motor 10.

Figure 2:
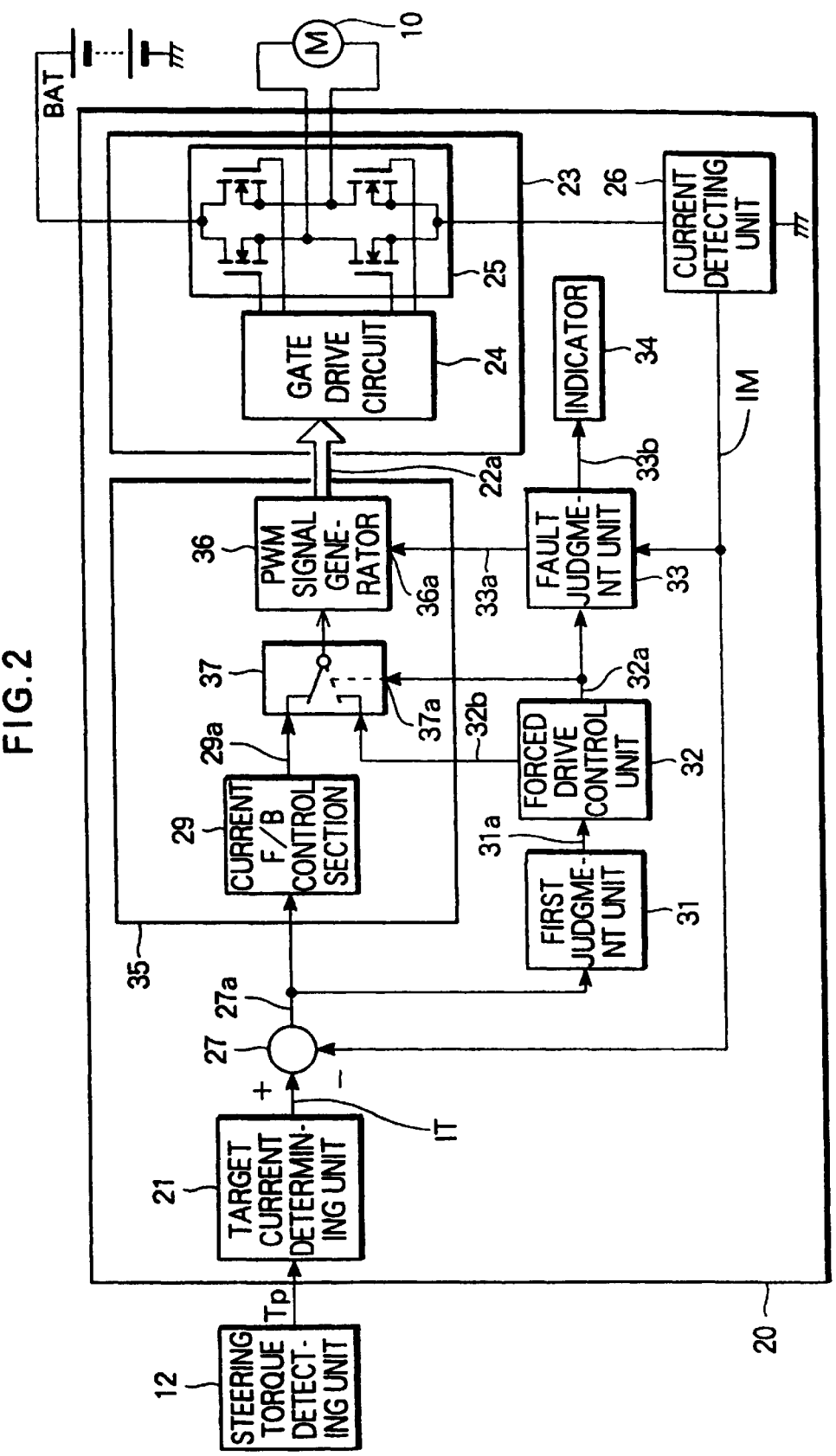
FIG. 2 is a block diagram showing a control unit or controller, for use with the electric power steering apparatus of FIG. 1, according to a first embodiment of the present invention.

FIG. 2 shows in block diagram the construction of a controller 20 according to a first embodiment of the present invention. The controller 20 shown in this figure differs from the conventional controller 200B in that a first judgment section or unit 31, a forced drive control section or unit 32, a fault judgment section or unit 33 and an indicator 34 are added. A motor operation control unit 35 of the controller 20 has a drive current signal switching section 37 provided between a current feedback (F/B) control section 29 and a PWM signal generating section or generator 36. An offset calculating unit 27 produces an offset signal 27a which in turn is input into the current feedback control section 29 and the first judgment unit 31.

Figure 3:
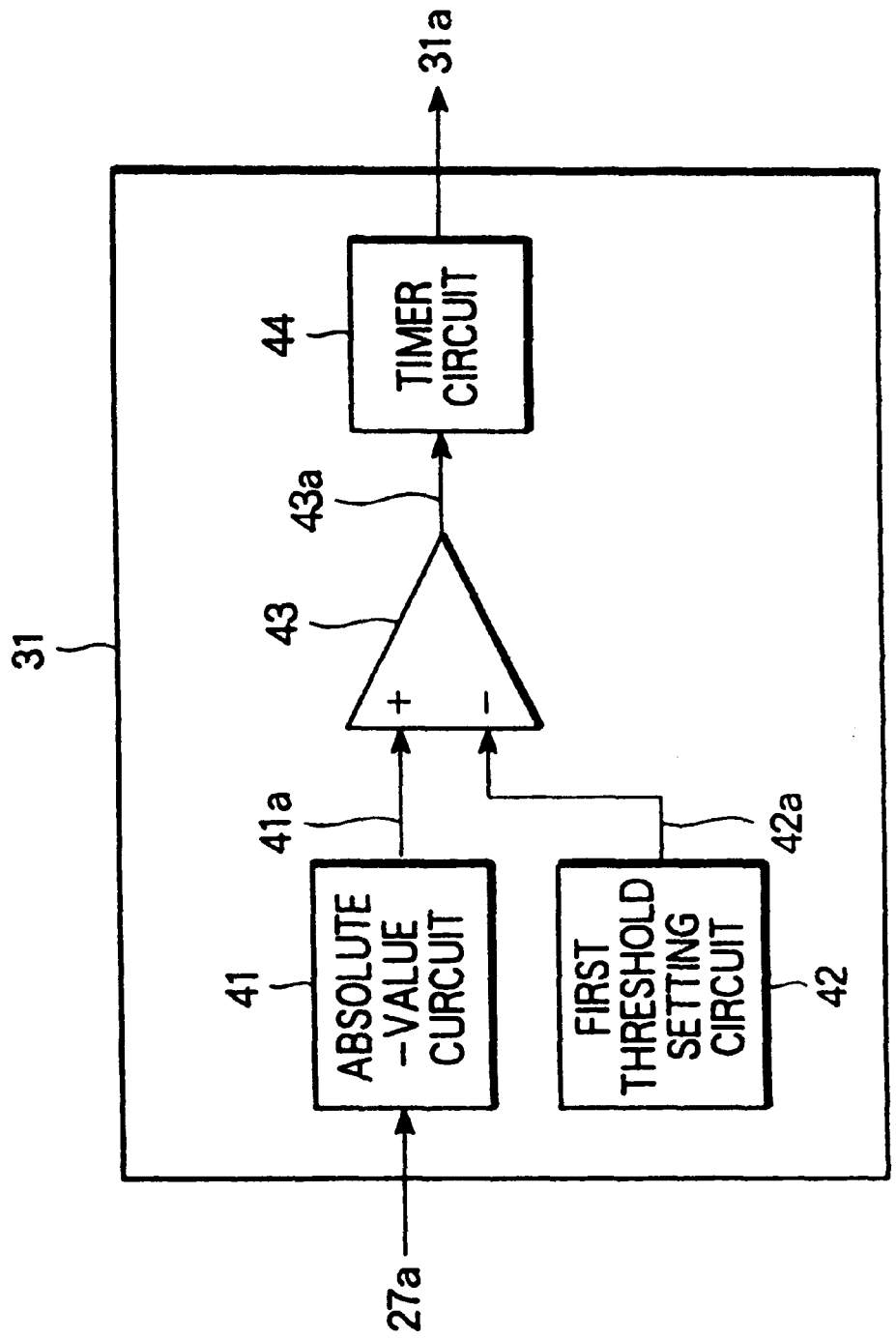
FIG. 3 is a block diagram showing a first judgment unit.

FIG. 3 shows in block diagram an example of the first judgment unit 31. The first judgment unit 31 includes an absolute-value circuit 41, a first threshold setting circuit 42, a comparator circuit 43 and a timer circuit 44.

The absolute-value circuit 41 determines an absolute value of the offset signal 27a and generates an absolute-value signal 41a. For an offset signal 27a of positive polarity, the absolute-value circuit 41 outputs this offset signal 27a without modification. For an offset signal 27a of negative polarity, the absolute-value circuit 41 generates an output signal which is equal in magnitude to the input offset signal but has an inverted polarity, i.e., the positive polarity. The absolute-value signal 41a is supplied to a comparison input terminal (+) of the comparator circuit 42.

The first threshold setting circuit 42 generates a preset first threshold signal 42a. The first threshold is set with reference to an offset output value produced when the manual steering operation is done positively. In other words, the first threshold is set at a value which is greater than an offset output value produced when the steering wheel is operated to adjust the steering direction little by little. The first threshold signal 42a is supplied to a reference input terminal (−) of the comparator circuit 43.

The comparator circuit 43 generates a comparator output signal 43a if the offset signal 27a is greater than the first threshold signal 42a. The comparator output signal 43a is supplied to the timer circuit 44.

The timer circuit 44, upon receipt of the comparator output signal 43a, times a duration of the comparator output signal 43a and produces a first judgment signal 31a when the timed duration the comparator output signal 43a reaches a preset allowable time. The allowable time is set in consideration of a response time during which the offset is rendered below the first threshold as a result of the feedback control effected on the current supplied to the electric motor 10 on the basis of the offset signal 27a.

This is because the longer the allowable time is, the greater is the delay in fault detecting timing of the current detecting unit. Conversely, a shorter allowable time causes frequent generation of a forced drive signal even though the current detecting unit is normally operating. The allowable time is set to a value of the order of 50 to 100 milliseconds, for example.

Figure 4:
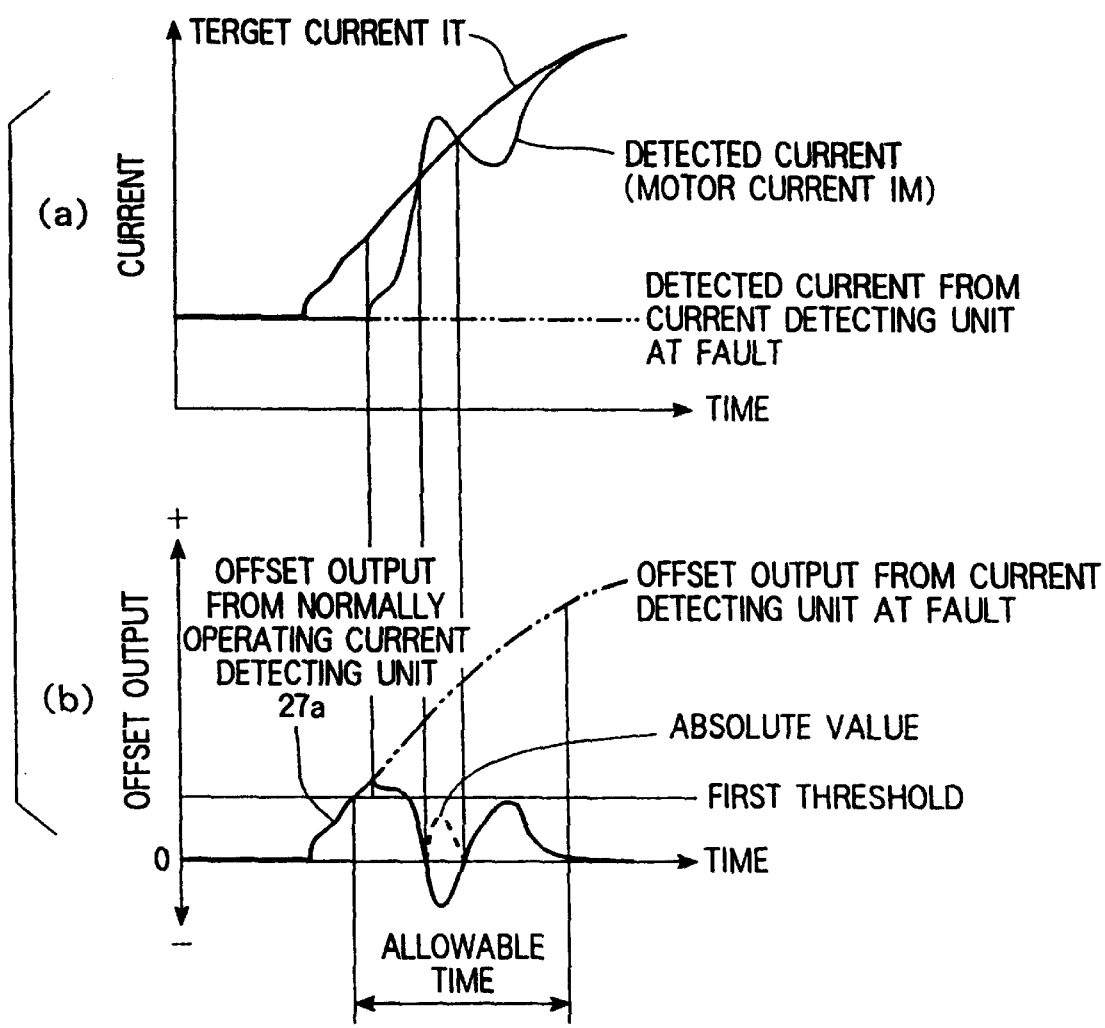
FIG. 4 is a graphical representation of an offset output and operation of the first judgment unit.

FIG. 4 is a graphical representation of the offset output and the operation of the first judgment unit 31 (FIGS. 2 and 3).

FIG. 4(a) illustrates the change in characteristic of the target current IT and the change in characteristic of the detected current (motor current IM as an output from the current detecting unit 26). When the current detecting unit 26 (FIG. 2) is normally operating, the current supplied to the electric motor 10 varies with the target current IT. Accordingly, the current IM detected by the current detecting unit 26 varies with the target current IT. In the case where the current detecting unit 26 is at fault, the detected current IM is fixed at a constant value, as indicated by the phantom line shown in FIG. 4(a).

FIG. 4(b) illustrates the change in characteristic of the offset output. When the target current IT and the detected current IM vary in the manner shown in FIG. 4(a), the offset (offset signal 27a) between the target current an the detected current varies in the manner indicated by the solid line shown in FIG. 4(b). In the case where the detected current IM is fixed at a constant value due to fault of the current detecting unit 26, a variation of the target current IT directly forms an off set output, as indicated by the phantom line shown in FIG. 4(b). In this instance, if the offset output is negative in polarity, the absolute-value signal 41a, an output from the absolute-value circuit 41 in the first judgment unit 31 (FIG. 3), is converted into a signal of positive polarity, as indicated by the broken line shown in FIG. 4(b).

The first judgment unit 31 shown in FIG. 3 generates a first judgment signal 31a when a condition, in which the offset output (absolute-value signal 41a output from the absolute-value circuit 41) is greater than the first threshold, has continued for the allowable time. Since the current detecting unit 26 (FIG. 2) produces an detected current variable with the motor current so long as it operates normally, the above-mentioned condition (in which the offset output exceeds the first threshold) does not continue for a long time. When the current detecting unit 26 is at fault, normal current feedback control cannot be expected any more, allowing the offset output to exceed the first threshold continuously for a time which is much longer than the allowable time. In the latter case, the first judgment unit 31 generates the first judgment signal 31a.

In the illustrated embodiment described above, the first judgment unit 31 is supplied with the offset signal 27a. The present invention should by no means be limited to the illustrated embodiment but may include an arrangement in which a drive control signal 22a (FIG. 2) is input to the first judgment unit 31. In this arrangement, the first threshold is changed in conformity with the drive control signal 22a.

As shown in FIG. 2, the first judgement signal 31a generated by the first judgment unit 31 is supplied to the 10 forced drive control unit 32. Upon receipt of the first judgment signal 31a, the forced drive control unit 32 generates a forced drive time period signal 32a indicative of a forced drive condition continuing over a preset forced drive period of time, and a forced drive control signal 32b. The forced drive time period signal 32a is supplied to a switching control input terminal 37a of the drive current signal switching section 37 and to the fault judgment unit 33.

The drive current signal switching section 37, when not supplied with the forced drive time period signal 32a, selects a drive current signal 29a supplied from the current feedback (F/B) control section 29 and supplies the selected drive current signal 29a to the PWM signal generator 36. Alternatively, when the drive current signal switching section 37 is supplied with the forced drive time period signal 32a, it continues supplying of the forced drive control signal 32b from the forced drive control unit 32 to the PWM signal generator 36.

The fault judgment unit 33, when it is supplied with the forced drive time period signal 32a, starts monitoring the motor current signal IM output from the current detecting unit 26. If the motor current signal IM does not change in the forced drive time period, and if a change (the amount of change) in the motor current signal IM is less than a preset fault judgment limit, the fault judgment unit 33 judges the current detecting unit 26 to be in operation failure or at fault and, based on this judgment, it produces a current feedback control stop command signal 33a and a current detection fault indication command 10 signal 33b. The current feedback control stop command signal 33a is supplied to a PWM signal generation stopping input terminal 36a of the PWM signal generator 36. The current detection fault indication command signal 33b is supplied to the indicator 34.

The PWM signal generator 36, when it is supplied with the current feed back control stop instruction signal 33a, stops generation and output of the drive control signal (PWM signal) 22a. The indicator 34 includes a suitable indicating device for either visual or audible indication of an abnormal condition of the current detecting operation.

Figure 5A:
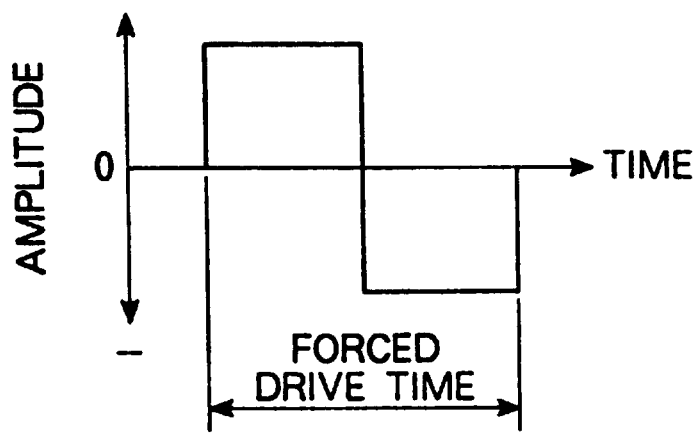
FIGS. 5A, 5B and 5C are graphs showing various examples of a forced drive control signal.
Figure 5B:
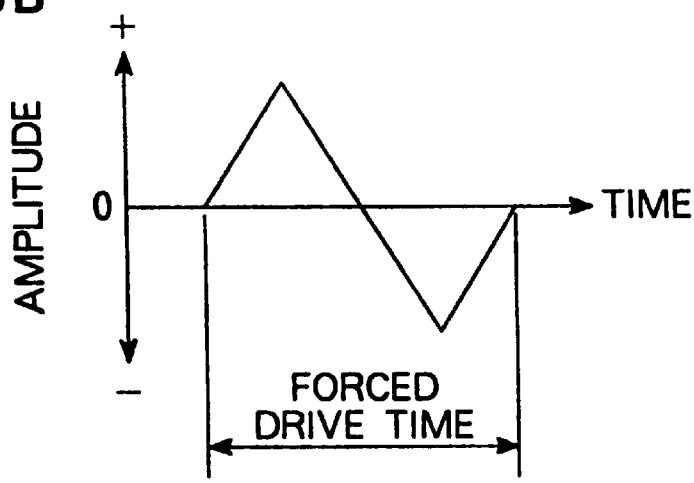
Figure 5C:
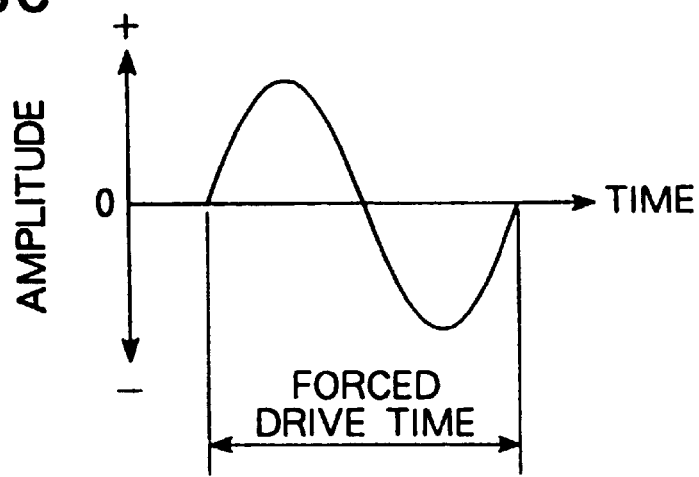

FIGS. 5A, 5B and 5C are graphs showing various examples of the waveform of the forced drive control signal 32b (FIG. 2).

The forced drive control signal 32b forcibly varies the current to be supplied to the electric motor 10 to thereby forcibly vary the detection output of the current detecting unit 26. The forced drive control signal 32b may have a suitable signal waveform such as a pulse waveform (FIG. 5A), a triangular waveform (FIG. 5B), or a sinusoidal waveform (FIG. 5C). In consideration of a fault judgment variation used for the judgment performed at the fault judgment unit 33 to determine whether or not the current detecting unit 26 is at fault due to a small variation of the detected current, the amplitude of the forced drive control signal 32b is so set as to ensure that the motor current is caused to vary to an extent sufficiently greater than the fault judgment variation. In concrete, the amplitude or intensity of the forced drive control signal 32b is set so that the electric motor 10 is supplied with its rated current or a relatively large current approximately several tens percent of the rated current.

In FIGS. 5A–5C, the polarity of the forced drive control signal 32b is changed or altered in both (positive and negative) directions to thereby alter the direction of the current to be supplied to the electric motor 10. The forced drive control signal 32b may be changed in amplitude only in the same polarity. In the cases illustrated in FIGS. 5A–5C, the polarity of the forced drive control signal 32b is changed in the positive and negative directions, and so it becomes possible to check the current detecting unit 26 against operation failure or fault with respect to each direction of the current supplied to the electric motor 10.

The forced drive time during which the current to be supplied to the electric motor 10 is forcibly varied based on the forced drive control signal 32b is set in an appropriate range determined such that the forced drive time is long enough to allow the current of the electric motor 10 to vary according to the forced drive control signal 32b, but is short enough to prevent the variation of the motor current from causing a great change in the steering assist torque. For example, this forced drive time is set in the range of several milliseconds to several tens milliseconds. A duration in which output of the forced drive control signal 32b continues and a duration in which output of the forced drive time signal continues are not necessarily coexistent with each other. The forced drive time signal 32a may be generated first, followed by generation of the forced drive control signal 32b, and after the forced drive control signal 32b is stopped, generation of the forced drive time signal 32a is stopped.

Figure 6:
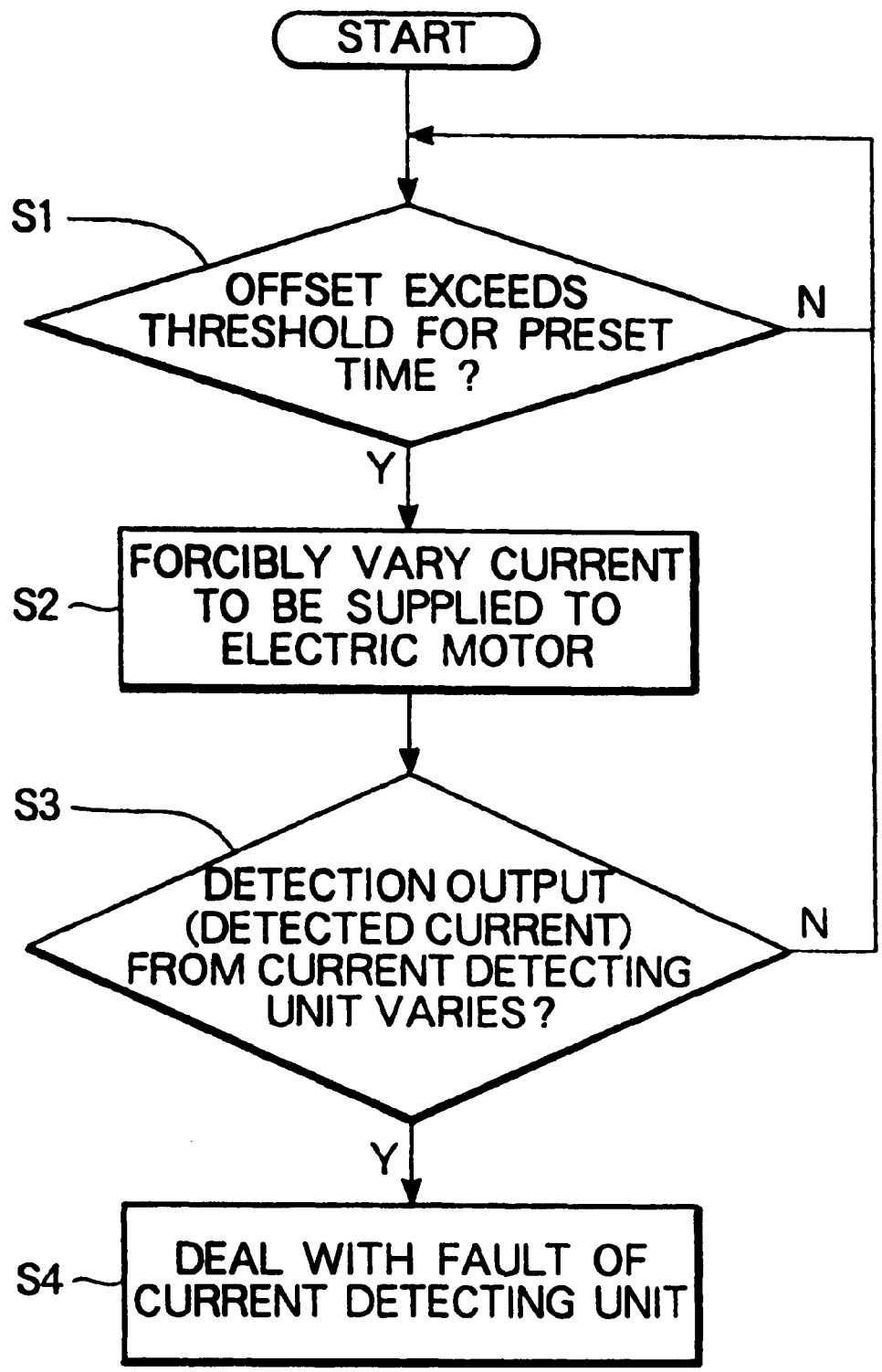
FIG. 6 is a flowchart showing a failure detecting operation performed by a current detecting unit of the controller shown in FIG. 2.

FIG. 6 is a flowchart showing a fault detecting operation performed by the current detecting unit 26 of the controller 20 shown in FIG. 2.

The first judgment unit 31 times, on the basis of the offset signal 27a, a duration of the condition in which a current offset between the target current IT and the motor current IM is greater than the first threshold, and it generates a first judgment signal 31a when the duration reaches the allowable time (Step S1).

Then, upon receipt of the first judgment signal 31a from the first judgment unit 31, the forced drive control unit 32 generates a forced drive time signal 32a tending to switch or shift the drive current signal switching section 37 to the block-lined side shown in FIG. 2. The forced drive control unit 32 also generates a forced drive control signal 32b and supplies it to the PWM signal generator 36. Consequently, a drive control signal (PWM signal) 22a generated on the basis of the forced drive control signal 32b is supplied to the motor drive unit 23 so that the current to be supplied to the electric motor 10 is varied forcibly (Step S2).

The fault judgment unit 33 monitors, on the basis of the forced drive time signal 32a and throughout the duration of the forced drive time, the change in the motor current signal IM which is an output from the current detecting unit 26. If there is no change in the motor current signal IM or if a variation of the motor current signal IM is small and less than the present fault judgment variation, the fault judgment unit 33 judges the current detecting unit 26 to be at fault and generates a current feedback control stop command signal 33a and a current detection fault indication command signal 33b (Step S3).

The PWM signal generator 36 stops generation of the drive control signal (PWM signal) 22a on the basis of the current feedback control stop command signal 33a supplied thereto (Step S4). Consequently, supply of the steering assist torque to the steering system is stopped, and so the steering operation should thereafter be performed by manual steering effort or power of the driver. The indicator 34 indicates an operation failure of the current detecting unit 26 on the basis of the current detection fault indication command signal 33b (Step S4).

Figure 7:
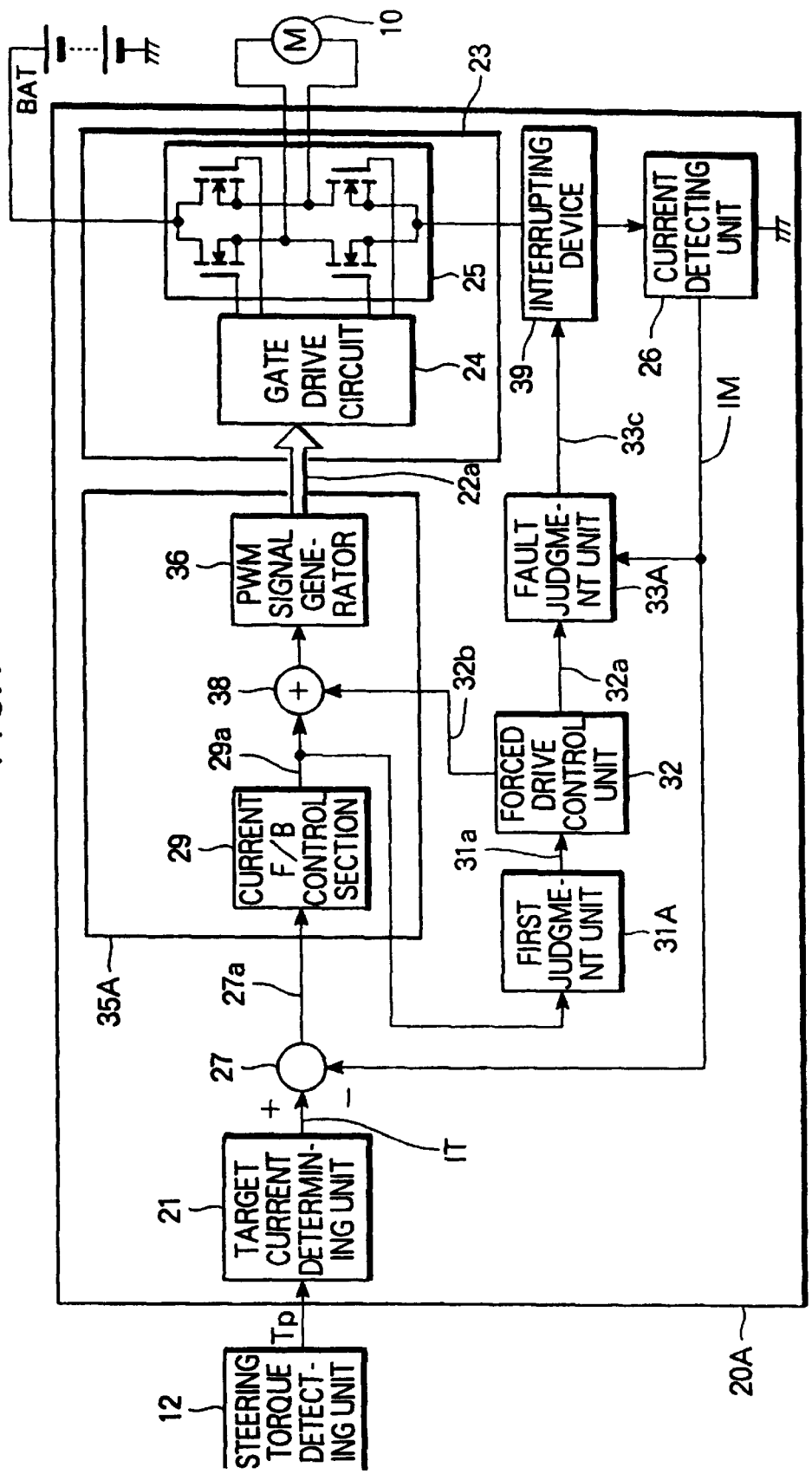
FIG. 7 is a block diagram showing a first modification of the controller in the first embodiment shown in FIG. 2.

FIG. 7 shows, in block diagram, a first modification of the controller in the first embodiment shown in FIG. 2.

The modified controller 20A is designed to make the above-mentioned first judgment on the basis of a drive current signal 29a which is an output from the current feedback (F/B) control section 29. A first judgment unit 31A of the modified controller 20A generates a first judgment signal 31a when a condition, in which the drive current signal 29a exceeds a present drive current threshold, has continued for a present allowable time. In other words, the first judgment unit 31A is constructed to generate the first judgment signal 31a when a condition, in which a relatively large current is to be supplied to the electric motor 10, continues for a relatively long period of time.

A motor operation control unit 35A of the modified controller 20A includes an adding section or adder 38 which acts to add up the drive current signal 29a and a forced drive control signal 32b and then to supply the result of addition (a representation of the sum of the two signals 29a and 32b) to the PWM signal generator 36. In the case where the forced drive control signal 32b is supplied from the forced drive control unit 32 to the adder 38 on the basis of the first judgment signal 31a, the drive current signal 29a is added to (or superimposed with) the forced drive control signal 32b so that the current to be supplied to the electric motor 10 is varied forcibly.

A fault judgment unit 33A of the modified controller 20A, when it judges the current detecting unit 26 to be operating abnormally or at fault, produces an interrupting command signal 33c tending to interrupt energization of the electric motor 10. An interrupting device 39 disposed in a current supply line from the battery BAT to the electric motor 10 operates to interrupt power supply to the electric motor 10 on the basis of the interrupting command signal 33c. The interrupting device 39 is a solid-state relay composed of solid-state components such as a relay, and a semiconductor switching element.

Figure 8:
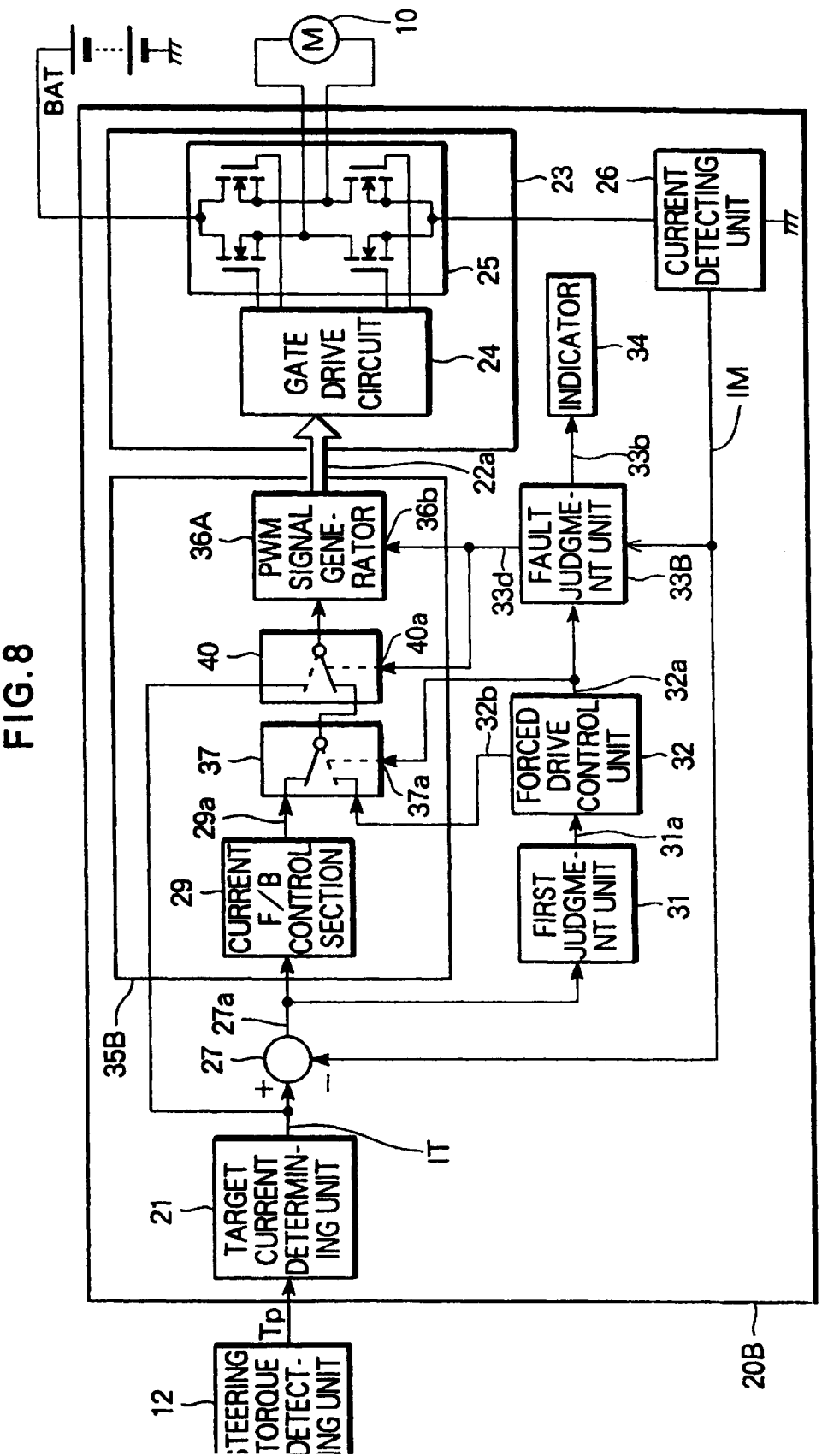
FIG. 8 is a block diagram showing a second modification of the controller in the first embodiment shown in FIG. 2.

FIG. 8 shows, in block diagram, a second modification of the controller in the first embodiment shown in FIG. 2.

The modified controller 20B includes a motor operation control unit 35B incorporating therein a control mode switching section 40 which acts to switch or changeover the current feedback control mode and the target current control mode in which operation of the electric motor 10 is controlled based on only the target current signal IT rather than by performing the current feedback control.

A fault judgment unit 33B, when it judges the current detecting unit 26 to be at fault, produces a control mode switching command signal 33d tending to switch or shift toward the target current control mode and supplies this command signal to a control mode switching input terminal 40a of the control mode switching section 40, thereby switching or changing over the operating position of the control mode switching section 40 such that the target current signal IT produced from the target current determining unit 21 is supplied to a PWM signal generator 36A. The fault judgment unit 33B also supplies the control mode switching command signal 33d to a PWM signal generation mode switching input terminal 33b of the PWM generator 36A so that the operation mode of the PWM signal generator 36A is switched such that the PWM signal generator 36A generates a drive control signal (PWM signal) 22a on the basis of the target current IT. With this arrangement, when an operation failure of the current detecting unit 26 occurs, the current feedback control is stopped and a subsequent control of the supply of the steering assist torque is performed on the basis of the target current signal IT.

The first judgment unit 31 may be constructed such that it monitors the duty cycle (duty factor) of the drive control signal (PWM signal) 22a produced from the PWM signal generator 36A and generates a first judgment signal 31a when the monitored duty cycle is greater than a preset duty cycle and this condition continues for an allowable time. The forced drive signal control unit 32 may be constructed such that it produces a forced drive control signal (PWM signal) used for forcible driving of the electric motor 10 and supplies it (forced drive control signal) to the motor drive unit 23 in place of the output from the PWM signal generator 36A whereby the current to be supplied to the electric motor 10 is varied forcibly on the basis of the forced drive control signal.

Figure 9:
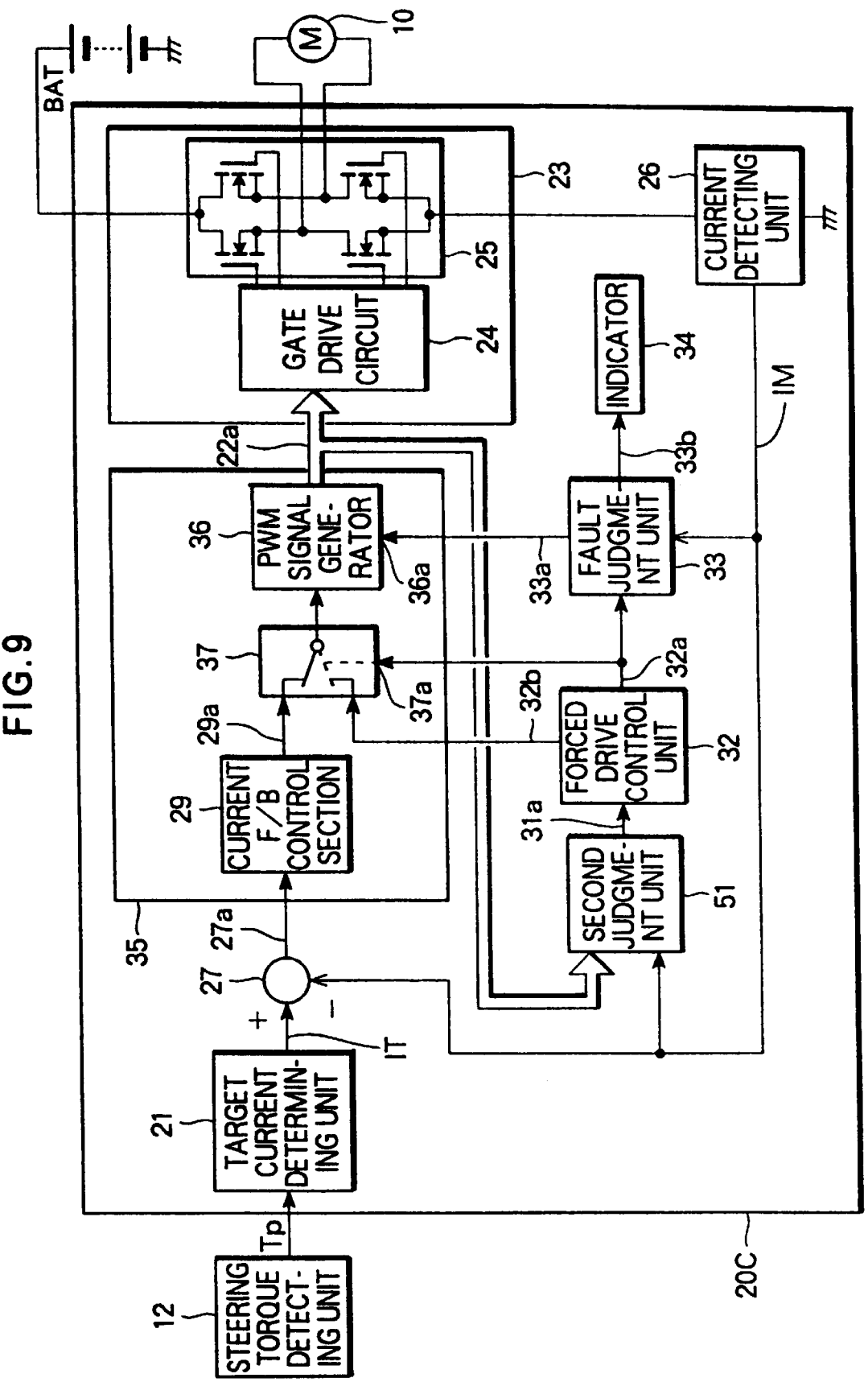
FIG. 9 is a block diagram showing a controller, for use with the electric power steering apparatus of FIG. 1, according to a second embodiment of the present invention.

FIG. 9 shows, in block diagram, the construction of a controller 20C according to a second embodiment of the present invention. The controller 20C has a second judgment unit 51 in place of the first judgment unit 31 of the controller 20 shown in FIG. 2. The second judgment unit 51 monitors in all times a drive control signal (PWM signal) 22a which is the output of the motor operation control unit 35. When the drive control signal (PWM signal) 22a is greater than a preset second threshold, the second judgment unit 31 further monitors a variation of the motor current signal IM generated from the current detecting unit 26, and if the variation of the motor current IM is smaller than a present fault judgment variation, it judges the current detecting unit 26 to be most possibly in an abnormally operating condition or at fault and thus generates a second judgment signal 51a.

Figure 10:
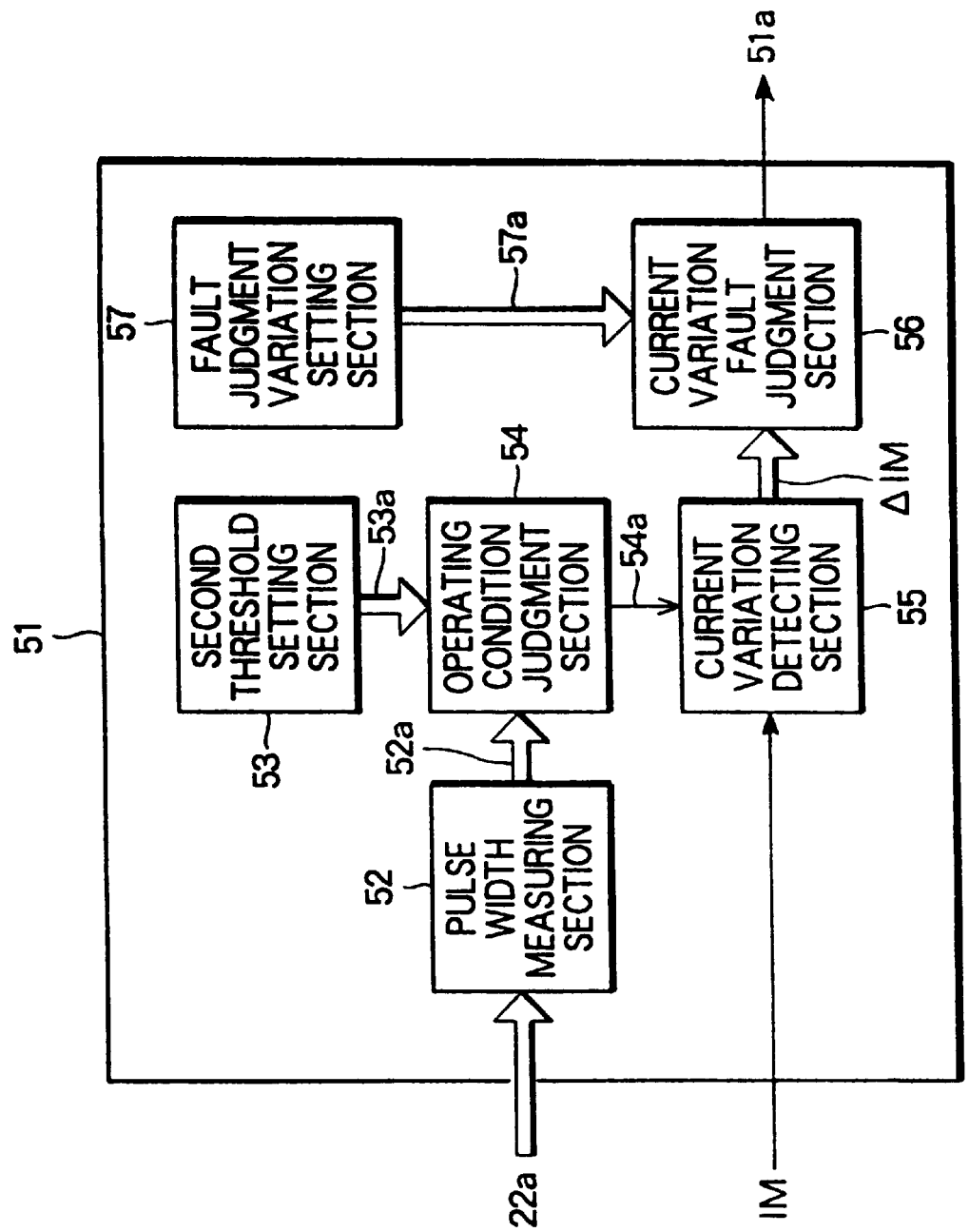
FIG. 10 is a block diagram showing a second judgment unit.

FIG. 10 shows, in block diagram, an example of the second judgment unit 51. The second judgment unit 51 includes a pulse width measuring section 52, a second threshold setting section 53, an operating condition judgment section 54, a current variation detecting section 55, a current variation fault judgment section 56, and a fault judgment variation setting section 57.

The pulse width measuring section 52 measures the duration of a drive control signal (PWM signal) 22a at high (H) level (i.e., pulse duration) and the duration of the same drive control signal at low (L) level (i.e., pulse period), and based on the result of measurement, it calculates a duty cycle or factor (H-level duration/(H-level duration+L-level duration)) of the drive control signal 22a and outputs the result of calculation as a detected duty cycle 52a. The pulse width measuring section 52 may act to measure the H-level duration or the L-level duration of the drive control signal 22a and to generate the result of measurement.

The second threshold setting section 53 supplies the operating condition judgment section 54 with an operating condition judgment threshold 53a in the form of a duty cycle or factor tending to increase the current to be supplied to the electric motor 10 (FIG. 9) to a relatively high level. In the case where the pulse width measuring section 52 is constructed to generate the H-level duration of the drive control signal 22a, the second threshold setting section 53 generates a preset H-level duration, as the second threshold (operating condition judgment threshold). Conversely, when used in combination with a pulse width measuring section 52 constructed to produce the L-level duration of the drive control signal 22a, the second threshold setting section 53 generates a preset L-level duration as the operating condition judgment threshold.

The operating condition judgment section 54 compares the detected duty cycle 52a with the second threshold (operating condition judgment threshold) 53a for their largeness or magnitude. If the detected duty cycle 52a is larger than the second threshold (operating condition judgment threshold) 53a, the operating condition judgment section 54 judges the electric motor 10 to be operating under the condition in which the electric motor 10 is generates a large steering assist torque. Based on this judgment, the operating condition judgment section 54 produces a motor operating condition detecting signal 54a.

While the motor operating condition detecting signal 54a is being supplied, the current variation detecting section 55 determines a variation of the motor current (detected current) IM per predetermined unit time (several milliseconds, for example) and generates an absolute value of the determined current variation as a current variation ΔIM.

The current variation fault judgment section 56 compares the magnitude of the current variation ΔIM detected by the current variation detecting section 55 with the magnitude of a fault judgment variation 57a supplied from the fault judgment variation setting section 57. If the current variation ΔIM is within or smaller than the fault judgment variation 57a, the current variation fault judgment section 56 generates a second judgment signal 51a. The current variation fault judgment section 56 may be constructed to generate such a second judgment signal 51a when the current variation ΔIM is smaller than the fault judgment variation 57a and this condition has continued for a preset monitoring time.

The fault judgment variation setting section 57 sets a lowest possible current variation as the fault judgment variation 57a, in consideration of the variation of the motor current per predetermined unit time which may occur when the electric motor 10 is supplied with a relatively large current. In other words, the fault judgement variation 57a is set such that so long as the current detecting unit 26 is operating normally, a variation ΔIM of the motor current (detected current) IM per predetermined unit time exceeds the fault judgment variation 57a.

Figure 11:
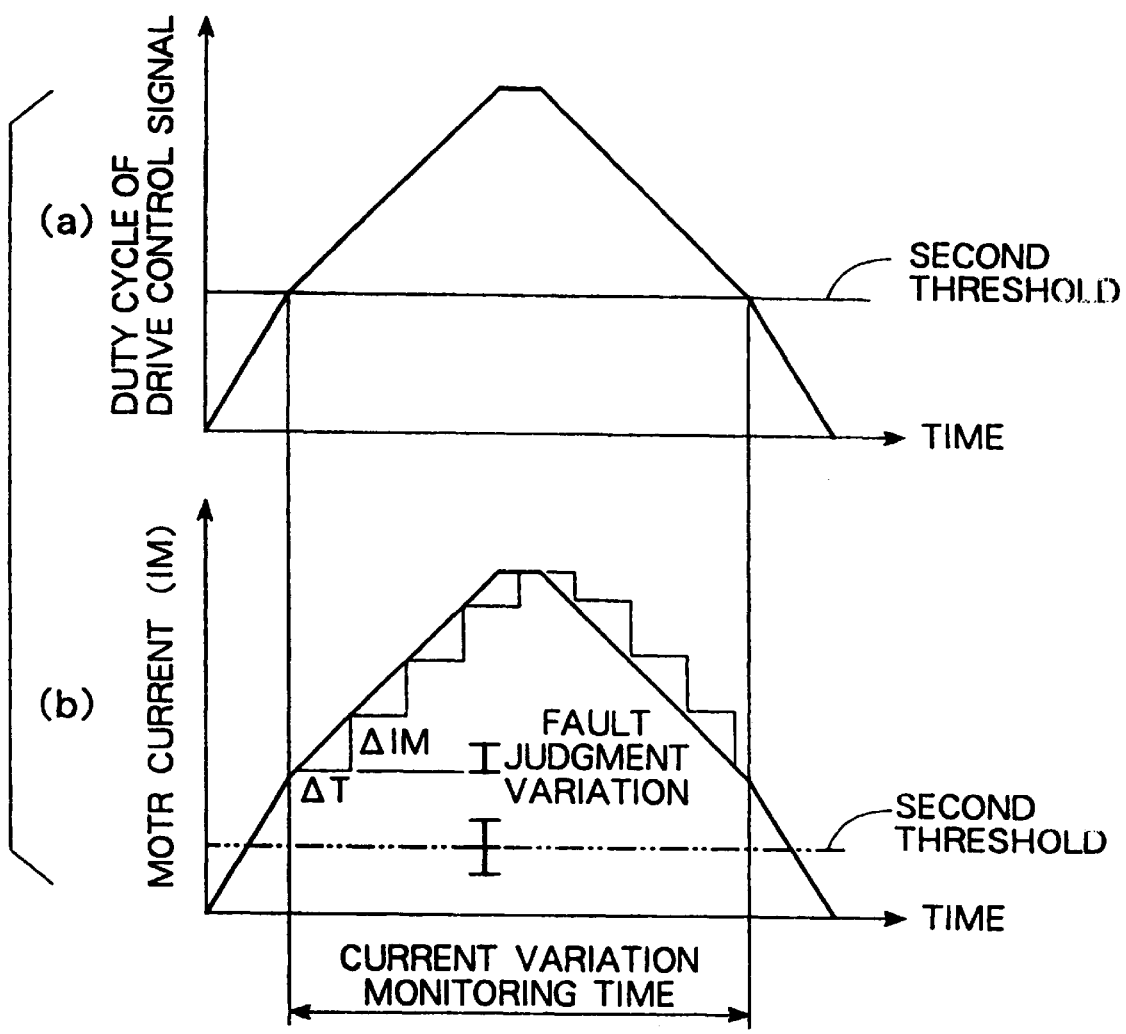
FIG. 11 is a graphical representation of the operation of the second judgment unit.

FIGS. 11(a) and 11(b) are graphs illustrative of the operation of the second judgment unit 51. More specifically, FIG. 11(a) shows a duty cycle of the drive control signal 22a, and FIG. 11(b) shows the detected current (motor current) IM which is the output of detection performed by the current detecting unit 26. As shown in FIG. 11(b), the time period during which the drive control signal 22a exceeds the second threshold is a current variation monitoring time. During the current variation monitoring time, if the current variation ΔIM per unit time is smaller than the fault judgment variation 57a, a second judgment signal 51a is generated. For example, as indicated by the phantom line shown in FIG. 10(b), the output from the current detecting unit 26 may be locked or fixed at a certain value due to a failure in operation of the current detecting unit 26. In this instance, even though detection of a current variation ΔIM is performed during the current variation monitoring time, no variation ΔIM is detected (variation is zero and smaller than the fault judgment variation). Consequently, the second judgment unit 51 generates a second judgment signal 51a.

Figure 12:
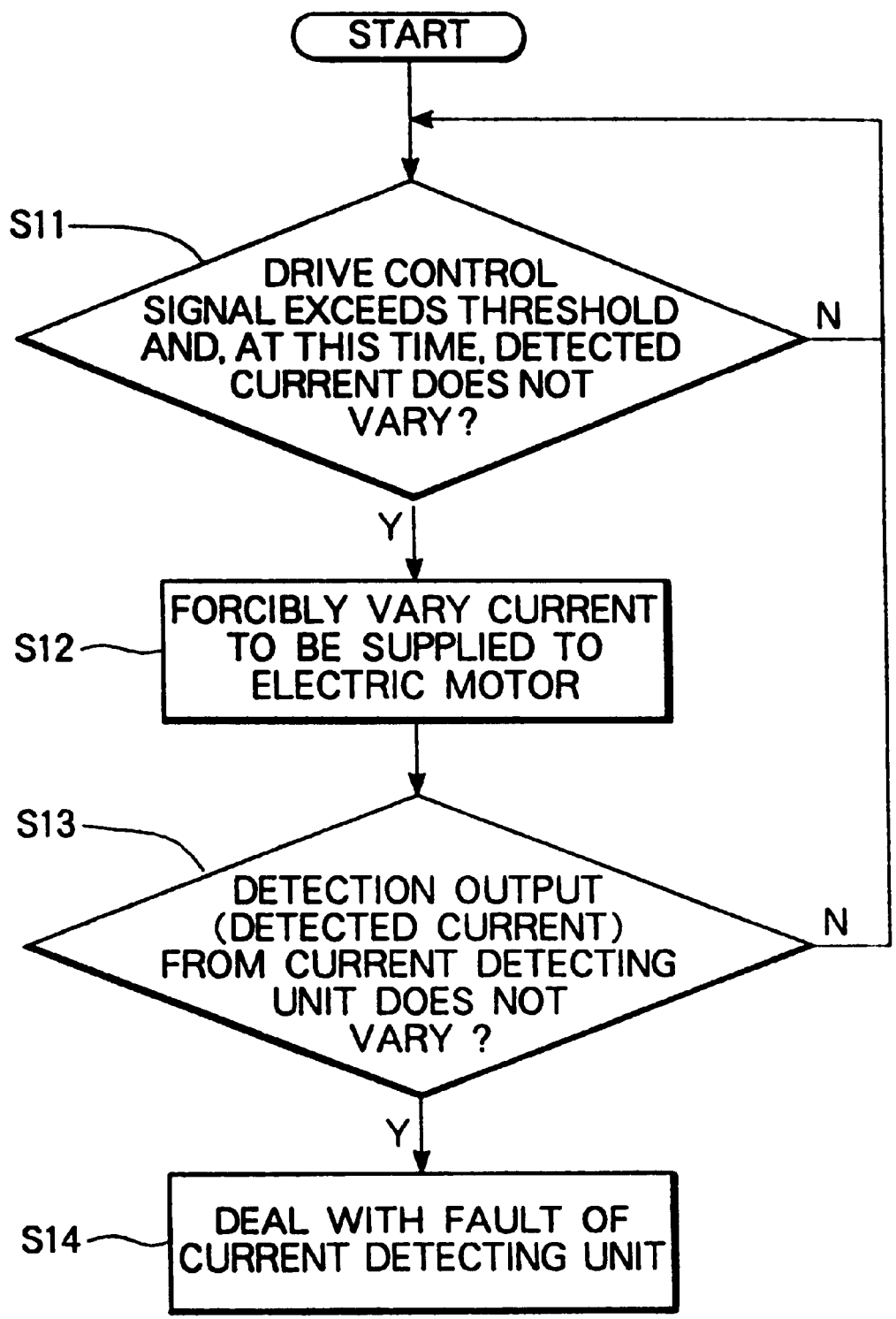
FIG. 12 is a flowchart showing a failure detecting operation performed by a current detecting unit of the controller shown in FIG. 9.

FIG. 12 is a flowchart showing a fault detecting operation performed by the current detecting unit 26 of the controller 20C in the second embodiment shown in FIG. 9.

The second judgment unit 51 generates a second judgment signal 51a when the drive control signal (PWM signal) 22a is greater than the second threshold and, at this time, the detected current IM does not vary, and when a variation of the detected current IM is smaller than the fault judgment variation 57a (FIG. 10) (Step S11).

Then, upon receipt of the second judgment signal 51a from the second judgment unit 51, the forced drive control unit 32 generates a forced drive time signal 32a tending to switch or shift the drive current signal switching section 37 to the side indicated by the broken line shown in FIG. 9. The forced drive control unit 32 also generates a forced drive control signal 32b and supplies it to the PWM signal generator 36. Consequently, a drive control signal (PWM signal) 22a generated on the basis of the forced drive control signal 32b is supplied to the motor drive unit 23 so that the current to be supplied to the electric motor 10 is varied forcibly (Step S12).

The fault judgment unit 33 monitors, on the basis of the forced drive time signal 32a and throughout the forced drive time, the change in the motor current signal IM which is an output from the current detecting unit 26. If there is no change or variation of the motor current signal IM or if a variation is small and does not exceed the fault judgment variation, the fault judgment unit 33 judges the current detecting unit 26 to be at fault and generates a current feedback control stop command signal 33a and a current detection fault indication command signal 33b (Step S13).

The PWM signal generator 36 stops generation of the drive control signal (PWM signal) 22a on the basis of the current feedback control stop command signal 33a (Step S14). Consequently, supply of the steering assist torque to the steering system is stopped, and so the steering operation should thereafter be performed manually by the steering effort or power of the driver. The indicator 34 indicates an operation failure in the current detecting unit 26 on the basis of the current detection fault indication command signal 33b (Step S14).

Figure 13:
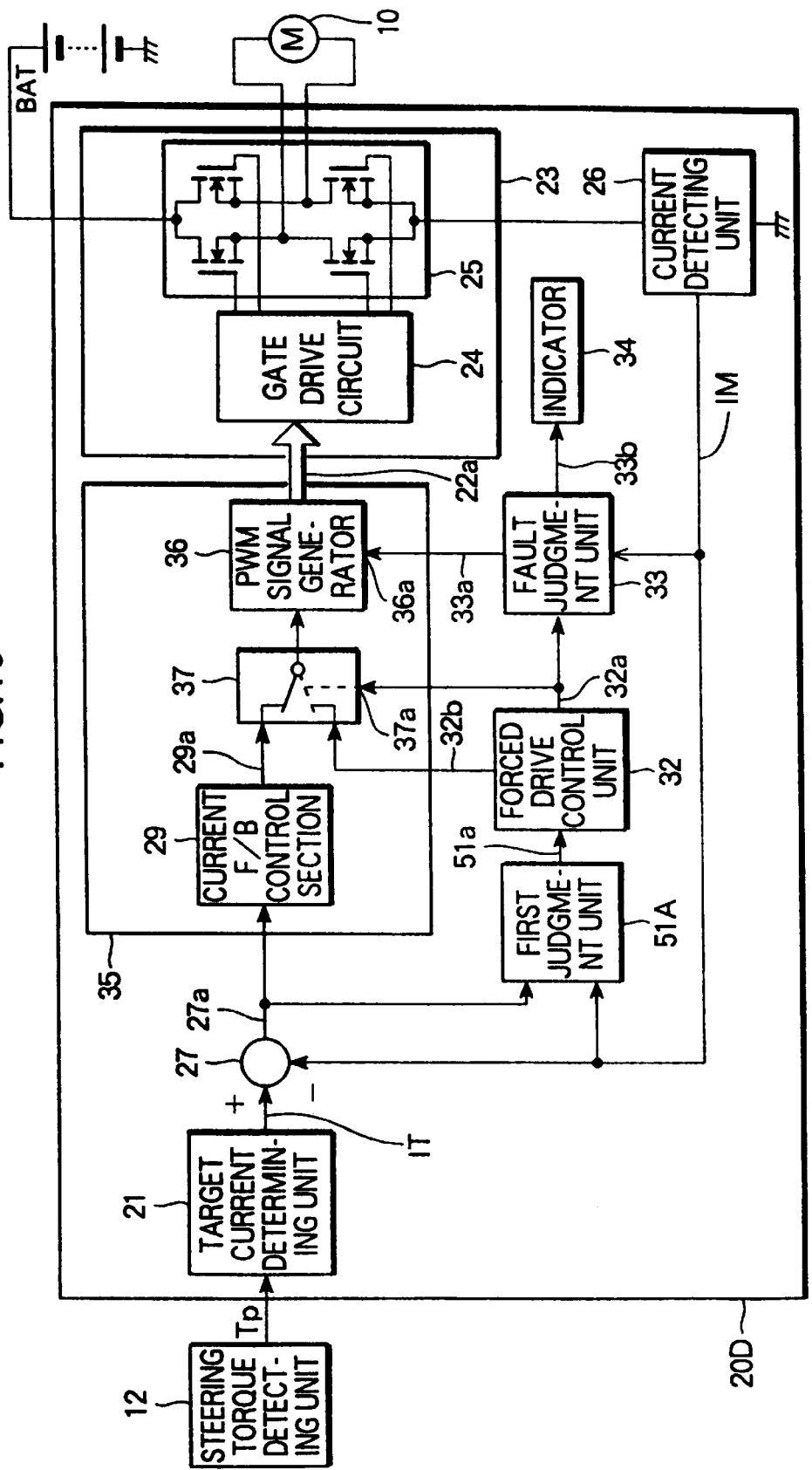
FIG. 13 is a block diagram showing a modification of the controller in the second embodiment shown in FIG. 9.

FIG. 13 shows, in block diagram, a modification of the controller in the second embodiment shown in FIG. 9.

The modified controller 20D includes a second judgment unit 51A which is constructed to detect a condition in which a predetermined current is supplied to the electric motor 10 on the basis of the offset signal 27a, to monitor a variation of the output (detected current IM) of the current detecting unit 26, and to generate a second judgment signal 51a if there is no variation of the detected current IM or if a variation of the detected current IM is smaller than a predetermined value.

Figure 14:
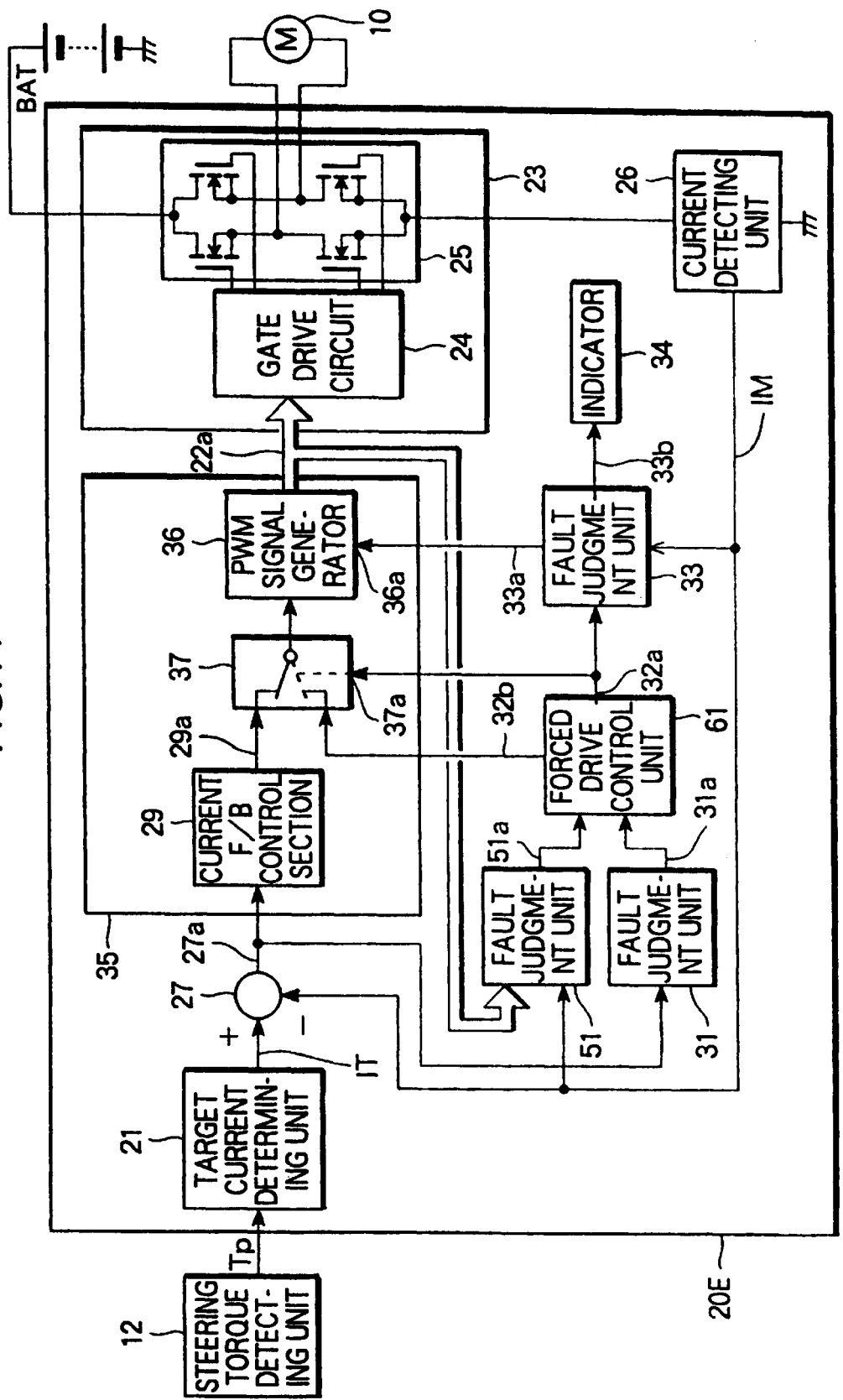
FIG. 14 is a block diagram showing a controller, for use with the electric power steering apparatus of FIG. 1, according to a third embodiment of the present invention.

FIG. 14 shows, in block diagram, the construction of a controller 20E according to a third embodiment of the present invention. The controller 20E has a first judgment unit 31 and a second judgment unit 51.

The first judgment unit 31 judges the current detecting unit 26 to be most possibly at fault when duration of a condition, in which the offset output 27a (in precise meaning, an absolute-value signal 41a as an output from the absolute-value circuit 41 shown in FIG. 3) exceeds the first threshold, has reached the present allowable time, and based on this judgment, the first judgment unit 31 generates a first judgment signal 31a. In this embodiment, the first judgment unit 31 is supplied with the offset signal 27a. The present invention should by no means be limited to the illustrated embodiment but may include an arrangement in which a drive control signal 22a is input to the first judgment unit 31. In the latter case, the first threshold is changed in agreement with the drive control signal 22a.

The second judgment unit 51 monitors in all times the drive control signal (PWM signal) 22a which is the output of the motor operation control unit 35. When the drive control signal (PWM signal) 22a exceeds a preset second threshold, the second judgment unit 31 further monitors a variation (or a change in quantity) of the motor current signal IM generated from the current detecting unit 26, and if the monitored variation of the motor current IM is smaller than a present fault judgment variation, it judges the current detecting unit 26 to be most possibly at fault and thus generates a second judgment signal 51a.

The forced drive control unit 61, when it is supplied with both of the first and second judgment signals 31a and 51a, generates a forced drive time signal 32a tending to switch or shift the drive current signal switching section 37 to the side indicated by the broken line shown in FIG. 14. At the same time, the forced drive control unit 32 also generates a forced drive control signal 32b and supplies it to the PWM signal generator 36. Consequently, a drive control signal (PWM signal) 22a generated on the basis of the forced drive control signal 32b is supplied to the motor drive unit 23 so that the current to be supplied to the electric motor 10 is varied forcibly.

The fault judgment unit 33 monitors, on the basis of the forced drive time signal 32a, the change in the motor current signal IM (i.e., an output from the current detecting unit 26) throughout the forced drive time. If there is no change in the motor current signal IM or if a variation (or a change in quantity) of the motor current signal IM is smaller than the present fault judgment variation, the fault judgment unit 33 judges the current detecting unit 26 to be at fault and generates a current feedback control stop command signal 33a and a current detection fault indication command signal 33b.

Figure 15:
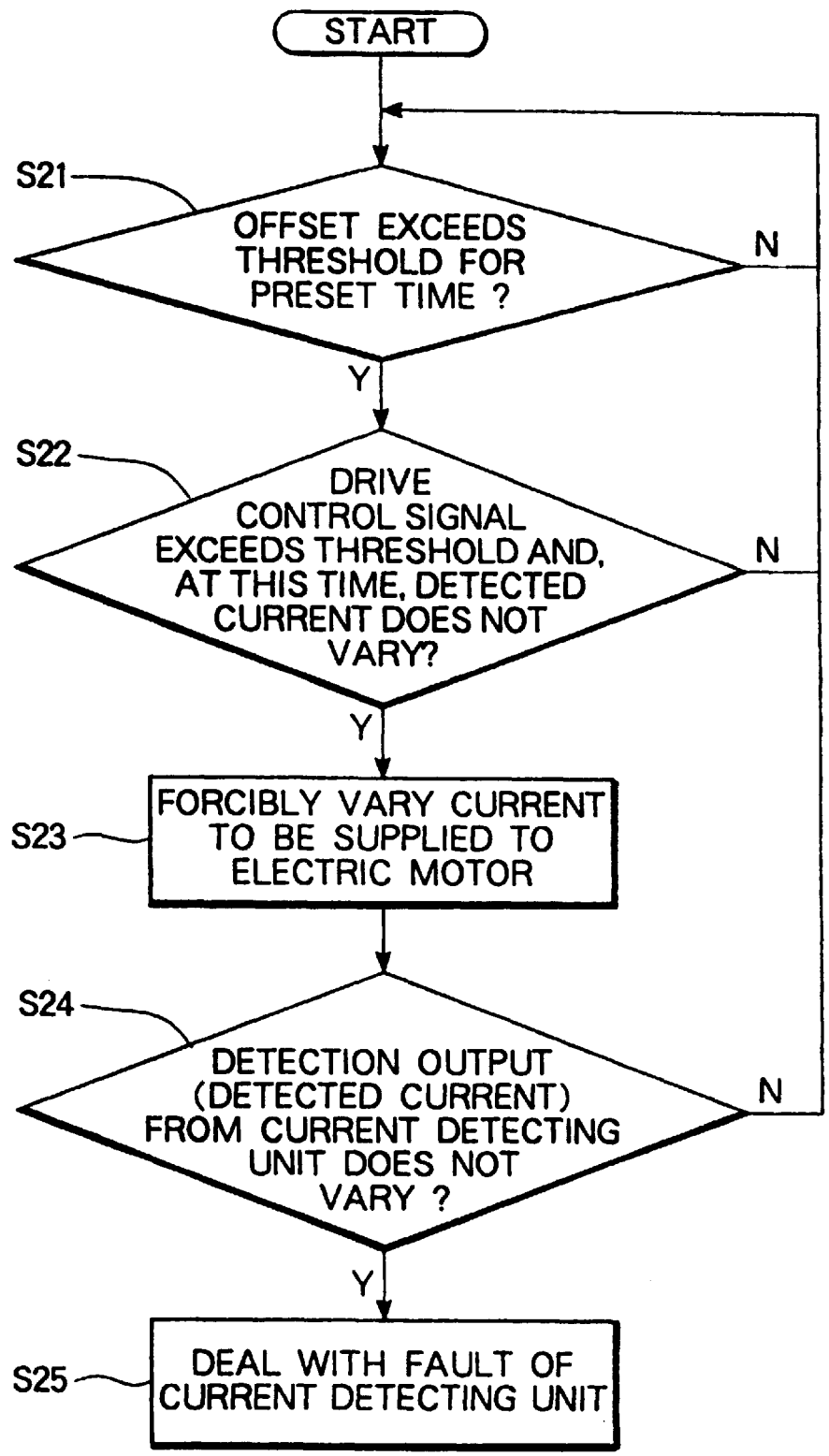
FIG. 15 is a flowchart showing a fault detecting operation performed by a current detecting unit of the controller shown in FIG. 14.

FIG. 15 is a flowchart showing a sequence of operations performed by the controller 20E of FIG. 14 so as to detect an operation failure in the current detecting unit 26.

If Step S21 judges that an offset exceeds the preset threshold for the preset duration, and subsequently if Step S22 judges that the drive control signal exceeds the threshold and, at this time, no change in the detected current is detected or a variation of the detected current is as small as the preset fault judgment variation, then Step 23 forcibly varies the current to be supplied to the electric motor 10. Subsequently, Step S24 monitors the output (detected current IM) from the current detecting unit 26. If this Step S24 judges that no change in the detected current IM is detected or a variation of the detected current IM is as small as the fault judgment variation, the control procedure goes to Step S25. At Step S25 a fail-safe operation is performed to deal with the fault of the current detecting unit 26. The order of the Steps S21 and S22 may be reversed.

The forced drive control unit 61 may be constructed to receive the first and second judgment signals 31a, 51a at different times. In this case, if one of these two judgment signal is followed by the other, the forced drive control unit 61 will perform forced driving of the electric motor 10 on the basis of the forced drive control signal 32b alone. As an alternative, the forced drive control unit 61 may be constructed to perform forced driving of the electric motor 10 on the basis of the forced drive control signal 32b alone when it is supplied with only one of the first and second judgment signals 31a, 51a.

Figure 16:
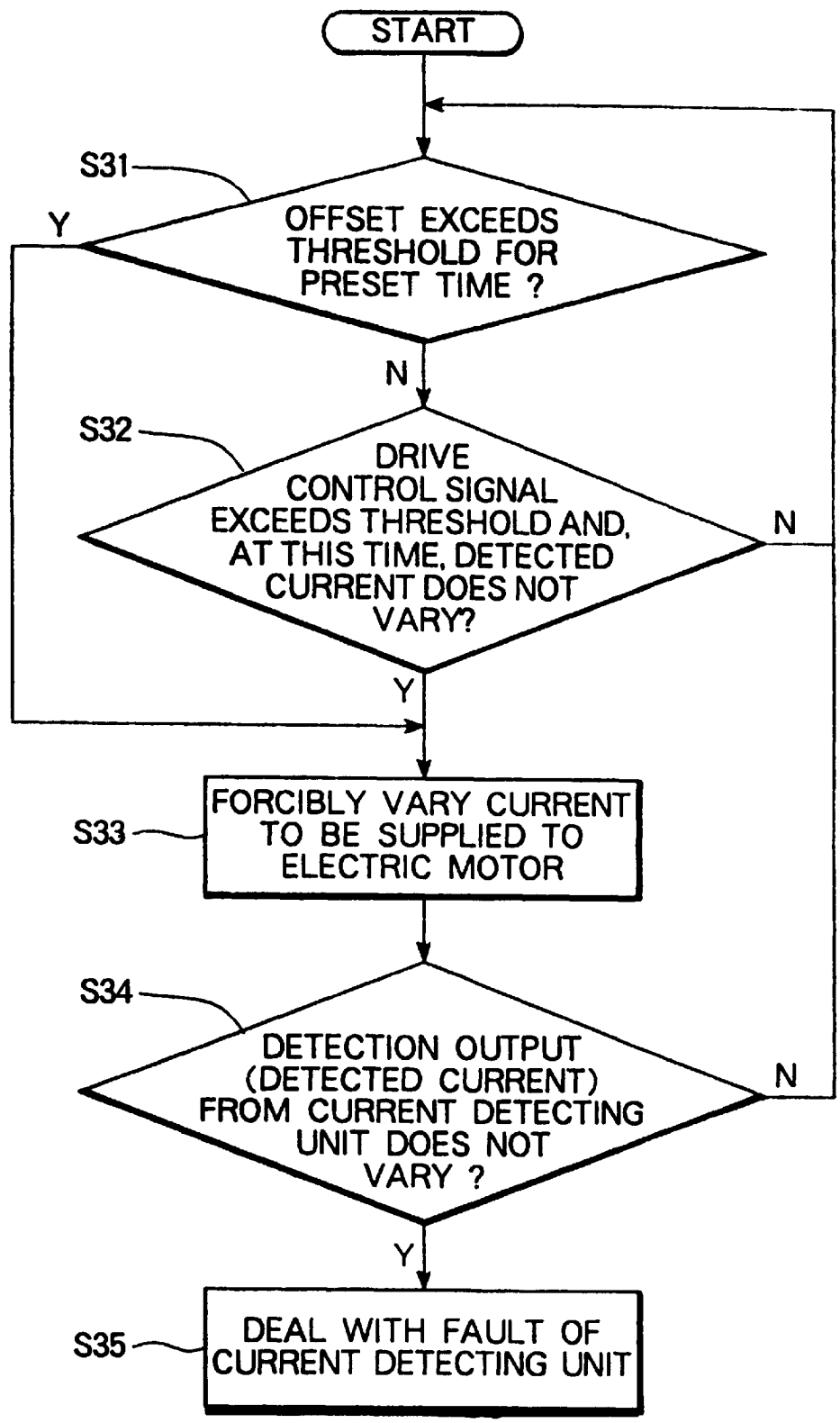
FIG.16 is a flowchart showing a fault detecting operation performed by the current detecting unit on the basis of a judgment signal supplied from either the first judgment unit or the second judgment unit.
Figure 17:
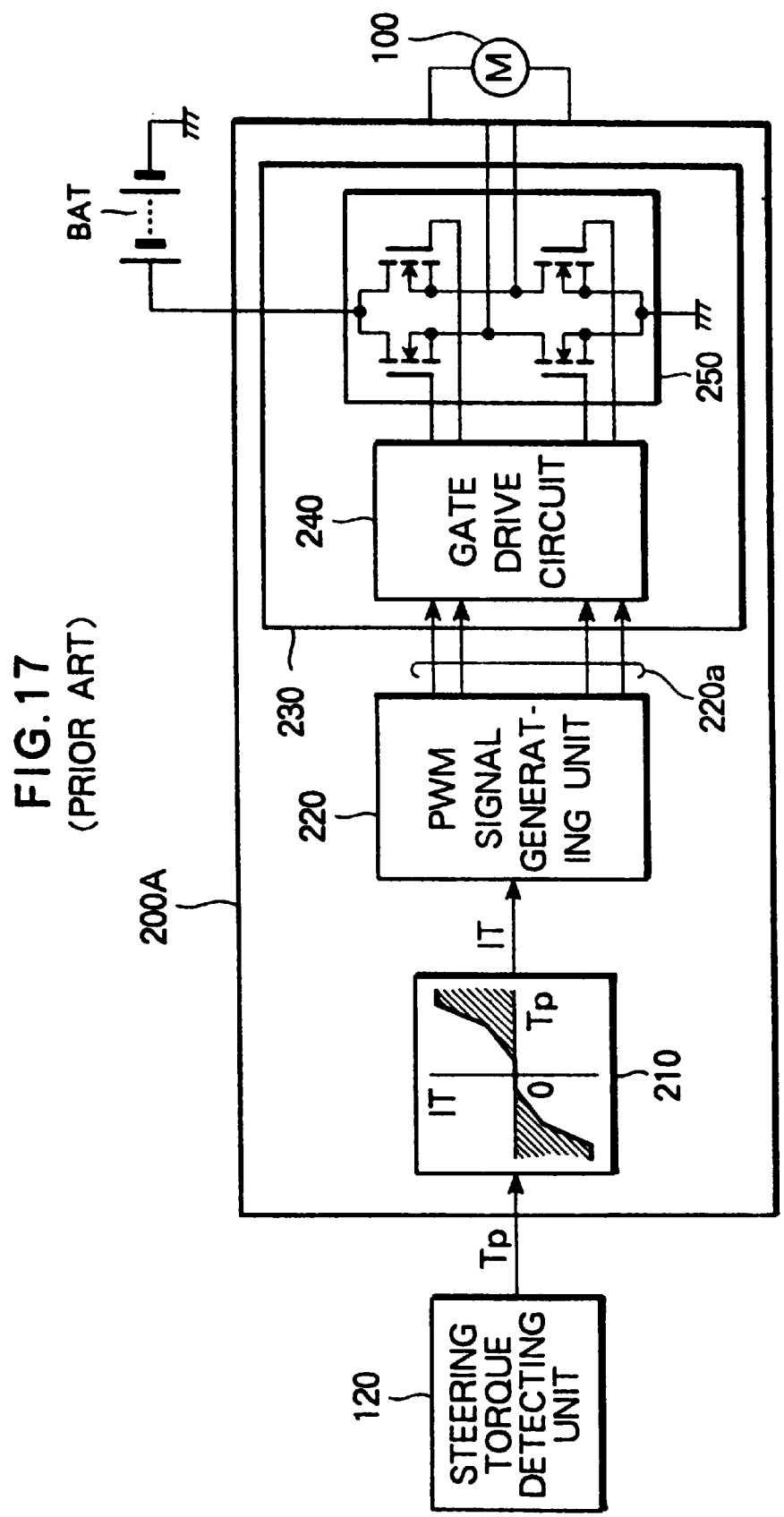
FIG. 17 is a block diagram showing a conventional control unit or controller.
Figure 18:
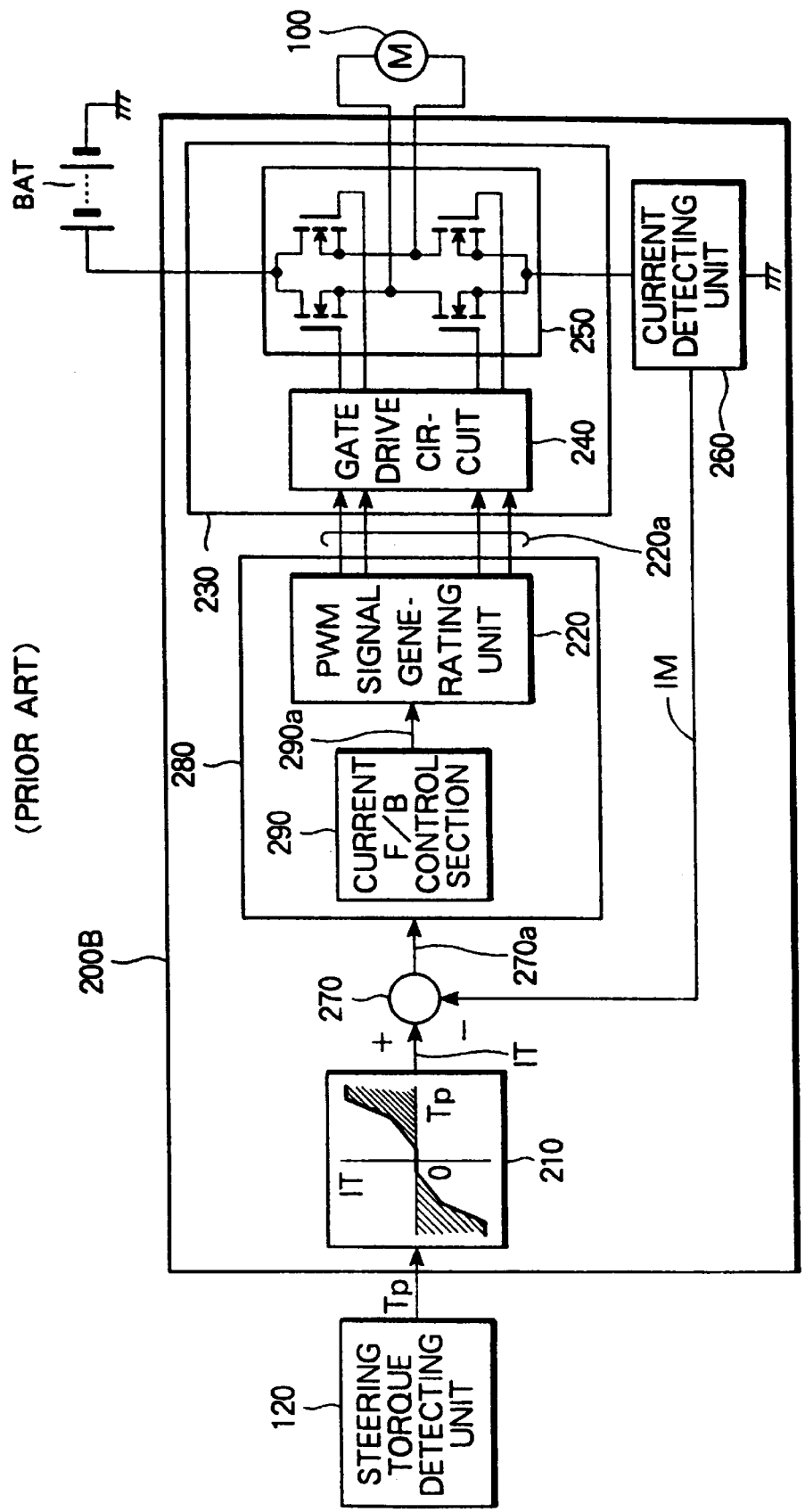
FIG. 18 is a block diagram showing another conventional controller.
Figure 19A:
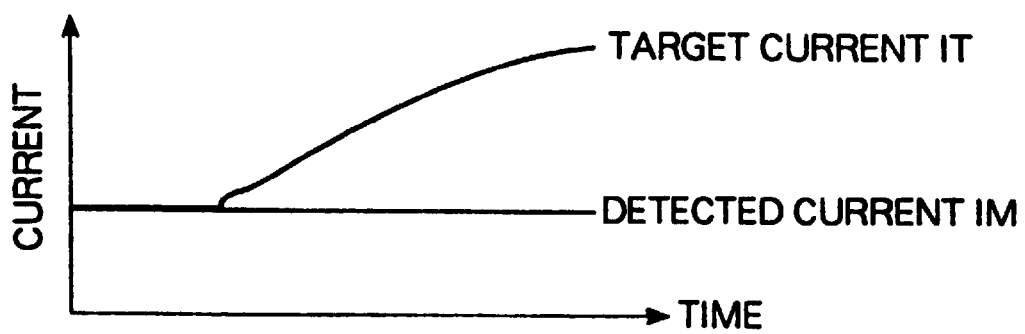
FIGS. 19A and 19B are graphs illustrative of the operation of the conventional controller taken place when a detection output from the current detecting unit is fixed at a constant value.
Figure 19B:
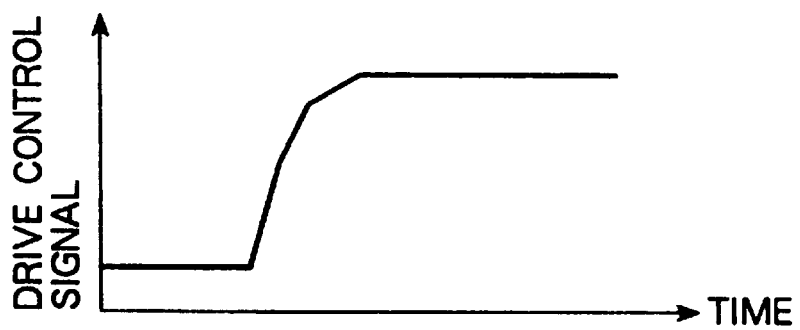

FIG. 16 is a flowchart showing a sequence of operations performed by the controller 20E of FIG. 14 in order to detect an operation failure of the current detecting unit 26 on the basis of the judgment signal supplied from the first judgment unit 31 or the judgment signal supplied from the second judgment unit 51. If the first judgment unit 31 passes a judgment at Step S31 that the offset continuously exceeds the preset threshold for the preset time, forced driving of the electric motor 10 will be performed at Step S33. If the second judgment unit 51 judges at Step S32 that the drive control signal 22a exceeds the preset threshold, and at this time, no change in the detected current IM is detected or a variation of the detected current is as small as the preset fault judgment variation, then Step S33 performs forced driving of the electric motor 10. If the forced driving of the electric motor 10 (Step S33) causes no change in the detected current IM or a variation of the detected current IM which is as small as the fault judgment variation (Step S34), then Step S35 performs a fail-safe operation to deal with the fault of the current detecting unit 26.

In the controllers 20, 20A–20E described above with respect to the illustrated embodiments, a microcomputer system may be used to construct the target current determining unit 21, the offset calculating unit 27 and the motor operation control units 35, 35A, 35B. In this instance, the first judgment units 31, 31A, the second judgment unit 51, the forced drive control units 32, 61 and the fault judgment units 33, 33A, 33B are preferably constituted by a microprogram instruction set. With this arrangement, an operation failure in the current detecting unit 26 can be detected to perform a fail-safe operation to deal with the detected operation failure, without requiring any change or modification of hardware configuration of the controllers 20, 20A–20E.

According to the present invention, a current to be supplied to the electric motor 10 is forcibly varied, and a response characteristic of the detected current (output from the current detecting unit 26) with respect to a variation of current is monitored to detect an operation failure in the current detecting unit 26. With this fault detection technique, it becomes possible to detect various operation failures, such as an accidental short of a current detecting resistor forming the current detecting unit 26, a burnout of a current prove equipped with a Hall element and so on, and an operation failure in an amplifying circuit provided to amplify the detected signal from the current detector.

Obviously, various minor changes and modifications are possible in the light of the above teaching. It is to be understood that within the scope of the appended claims the present invention may be practiced otherwise than as specifically described.

What is claimed is:

1. An electric power steering apparatus including an electric motor for providing an assist torque to a steering system, a steering torque detecting unit for detecting a steering torque exerted on said steering system to generate a steering torque signal, a target current determining unit for determining, on the basis of at least said steering torque signal, a target current to be supplied to said electric motor so as to generate a target current signal, a current detecting unit for detecting a current flowing through said electric motor to generate a motor current signal, an offset calculating unit for calculating an offset between said target current signal and said motor current signal to generate an offset signal, a motor operation control unit for generating, on the basis of said offset signal, a drive control signal to drive said electric motor, and a motor drive unit for driving said electric motor on the basis of said drive control signal, said electric power steering apparatus comprising:

a judgment unit which passes a judgment that a condition in which one of said offset signal and said drive control signal exceeds a preset threshold has continued for a preset allowable time;

a forced drive control unit for generating a forced drive control signal tending to forcibly drive said electric motor when said judgment is passed by said judgment unit; and a fault judgment unit which judges said current detecting unit to be at fault if said motor current signal does not vary even though said electric motor is forcibly driven.

2. An electric power steering apparatus according to claim 1, wherein said motor operation control unit includes a drive current switching section for switching said offset signal and said forced drive control signal generated from said forced drive control unit.

3. An electric power steering apparatus according to claim 1, wherein said allowable time is set to a response time during which a current supplied to said electric motor on the basis of said offset signal is fed back to tend said offset below said threshold.

4. An electric power steering apparatus according to claim 1, wherein said judgment unit includes an absolute-value circuit for determining an absolute value of said offset signal to generate an absolute-value signal, a threshold circuit for generating a preset threshold signal, a comparator circuit for generating a comparison output signal if said offset signal is greater than said threshold, and a timer circuit for timing a duration of said comparison output signal to generate a judgment signal as an output signal from said judgment unit when the timed duration reaches said preset allowable time.

5. An electric power steering apparatus according to claim 1, wherein said fault judgment unit, when it judges said current detecting unit to be at fault, generates a current feedback control stop command signal to stop generation of said drive control signal from said motor operation control unit.

6. An electric power steering apparatus according to claim 1, wherein said motor operation control unit includes an adder for adding together said offset signal and said forced drive control signal from said forced drive control unit, so as to forcibly vary the current to be supplied to said electric motor.

7. An electric power steering apparatus according to claim 1, wherein said fault judgment unit, when it judges said current detecting unit to be at fault, generates an interrupting command signal, further including an interrupting device for interrupting supply of power from a battery to said electric motor on the basis of said interrupting command signal.

8. An electric power steering apparatus according to claim 2, wherein said motor operation control unit includes a control mode switching section for switching, on the basis of a control mode switching command signal generated by said fault judgment unit when said fault judgment unit judges said current detecting unit to be at fault, the control mode of said motor operation control unit so as to perform operation control of said electric motor based on said target current signal.

9. An electric power steering apparatus including an electric motor for providing an assist torque to a steering system, a steering torque detecting unit for detecting a steering torque exerted on said steering system to generate a steering torque signal, a target current determining unit for determining, on the basis of at least said steering torque signal, a target current to be supplied to said electric motor so as to generate a target current signal, a current detecting unit for detecting a current flowing through said electric motor to generate a motor current signal, an offset calculating unit for calculating an offset between said target current signal and said motor current signal to generate an offset signal, a motor operation control unit for generating, on the basis of said offset signal, a drive control signal to drive said electric motor, and a motor drive unit for driving said electric motor on the basis of said drive control signal, said electric power steering apparatus comprising:

a judgment unit which passes a judgment that a variation of said motor current signal per unit time is smaller than a predetermined value when one of said offset signal and said drive control signal is greater than a preset threshold;

a forced drive control unit for generating a forced drive control signal tending to forcibly drive said electric motor when said judgment unit has passed said judgment; and a fault judgment unit which judges said current detecting unit to be at fault if said motor current signal does not vary even though said electric motor is forcibly driven.

10. An electric power steering apparatus according to claim 9, wherein said motor operation control unit includes a drive current switching section for switching said offset signal and said forced drive control signal generated from said forced drive control unit.

11. An electric power steering apparatus according to claim 9, wherein said judgment unit includes a pulse width measuring section for calculating a duty cycle of said drive control signal to generate the result of calculation as a detected duty cycle, a threshold setting section for generating a preset threshold signal, an operating condition judgment section for making a judgment based on said detected duty cycle and said threshold signal to determine whether or not said electric motor is in the operating state and, if said judgment is indicative of said electric motor being in the operating state, for generating a motor operating condition detecting signal, a current variation detecting section for determining a variation of said motor current per a predetermined unit time while said motor operating condition detecting signal is being supplied from said operating condition judgment section, so as to generate an absolute value of the detected variation as a current variation, a fault judgment variation setting section for generating a preset fault judgment variation, and a current variation fault judgment section for comparing said current variation with said said fault judgment variation and, if said current variation is smaller than said fault judgment variation, for generating a judgment signal.

12. An electric power steering apparatus according to claim 9, wherein said fault judgment unit, when it judges said current detecting unit to be at fault, generates a current feedback control stop command signal to stop generation of said drive control signal from said motor operation control unit.

13. An electric power steering apparatus according to claim 9, wherein said judgment unit acts to detect a condition in which a predetermined current is supplied to said electric motor, monitor a variation of the detected current which is the output from said current detecting unit, and generate a judgment signal if said variation is smaller than a preset value.

14. An electric power steering apparatus including an electric motor for providing an assist torque to a steering system, a steering torque detecting unit for detecting a steering torque exerted on said steering system to generate a steering torque signal, a target current determining unit for determining, on the basis of at least said steering torque signal, a target current to be supplied to said electric motor so as to generate a target current signal, a current detecting unit for detecting a current flowing through said electric motor to generate a motor current signal, an offset calculating unit for calculating an offset between said target current signal and said motor current signal to generate an offset signal, a motor operation control unit for generating, on the basis of said offset signal, a drive control signal to drive said electric motor, and a motor drive unit for driving said electric motor on the basis of said drive control signal, said electric power steering apparatus comprising:

a first judgment unit which passes a judgment that a condition in which one of said offset signal and said drive control signal exceeds a first threshold has continued for a preset allowable time;

a second judgment unit which passes a judgment that a variation of said motor current signal per unit time is smaller than a predetermined value when said drive control signal is greater than a second threshold;

a forced drive control unit for generating a forced drive control signal tending to forcibly drive said electric motor when said judgment of said first judgment unit and said judgment of said second judgment unit have passed concurrently; and a fault judgment unit which judges said current detecting unit to be at fault if said motor current signal does not vary even though said electric motor is forcibly driven.

15. An electric power steering apparatus according to claim 14, wherein said motor operation control unit includes a drive current switching section for switching said offset signal and said forced drive control signal generated from said forced drive control unit.

16. An electric power steering apparatus according to claim 14, wherein said fault judgment unit, when it judges said current detecting unit to be at fault, generates a current feedback control stop command signal to stop generation of said drive control signal from said motor operation control unit.

* * * * *